(12) United States Patent
Pawliszyn et al.

(10) Patent No.: US 12,239,957 B2
(45) Date of Patent: Mar. 4, 2025

(54) FLOW-THROUGH AEROSOL CAPTURE DEVICE

(71) Applicant: JP SCIENTIFIC LIMITED, Waterloo (CA)

(72) Inventors: Janusz Boleslaw Pawliszyn, Waterloo (CA); Shakiba Zeinali, Waterloo (CA)

(73) Assignee: JP SCIENTIFIC LIMITED, Waterloo (CA)

( * ) Notice: Subject to any disclaimer, the term of this patent is extended or adjusted under 35 U.S.C. 154(b) by 395 days.

(21) Appl. No.: 17/675,349

(22) Filed: Feb. 18, 2022

(65) Prior Publication Data

US 2022/0274091 A1    Sep. 1, 2022

Related U.S. Application Data

(60) Provisional application No. 63/273,991, filed on Oct. 31, 2021, provisional application No. 63/154,755, filed on Feb. 28, 2021.

(51) Int. Cl.
*B01J 20/26* (2006.01)
*B01D 39/16* (2006.01)
(Continued)

(52) U.S. Cl.
CPC ........ *B01J 20/261* (2013.01); *B01D 39/1623* (2013.01); *B01D 46/0036* (2013.01);
(Continued)

(58) Field of Classification Search
CPC ................ B01J 20/261; B01J 20/28023; B01J 20/28047; B01J 20/3007; B01J 20/3064;
(Continued)

(56) References Cited

U.S. PATENT DOCUMENTS 6,101,886 A  *  8/2000  Brenizer .............. G01N 1/2205
                                                    73/863.25
6,887,563 B2 *  5/2005  Frank ...................... C04B 28/26
                                                      428/313.9

(Continued)

OTHER PUBLICATIONS

Zeinali, et al., "Determination of Droplet-bound and Free Gas-phase Fragrances Using a Filter-incorporated Needle-trap Device and Solid-phase Microextraction Technologies," Journal of Agricultural and Food Chemistry, 2021, vol. 69 (45), 11 pages.

(Continued)

*Primary Examiner* — Frank M Lawrence, Jr.
(74) *Attorney, Agent, or Firm* — Borden Ladner Gervais LLP; David Nauman

(57) ABSTRACT

The present disclosure provides a flow-through aerosol capture device that includes a chamber defining an airflow path, and at least one heat-stable aerogel filter, for example a heat-stable polymer aerogel filter, disposed in the airflow path for capturing aerosol particles when an aerosol-containing gas passes through the filter. The flow-through aerosol capture device may be a needle-trap device or a thermal desorption liner with a heat-stable aerogel filter in the lumen of the needle or the liner. The disclosure also provides heat-stable polymer aerogels and methods of making such aerogels.

17 Claims, 4 Drawing Sheets

(51) Int. Cl.
- *B01D 46/00* (2022.01)
- *B01D 53/04* (2006.01)
- *B01J 20/28* (2006.01)
- *B01J 20/30* (2006.01)
- *D01D 5/00* (2006.01)
- *D01F 6/18* (2006.01)

(52) U.S. Cl.
CPC .... *B01D 53/0407* (2013.01); *B01J 20/28023* (2013.01); *B01J 20/28047* (2013.01); *B01J 20/3007* (2013.01); *B01J 20/3064* (2013.01); *D01D 5/003* (2013.01); *D01F 6/18* (2013.01); *B01D 2239/0631* (2013.01); *B01D 2239/10* (2013.01); *B01D 2239/1225* (2013.01); *B01D 2239/1233* (2013.01); *B01D 2239/1291* (2013.01); *D10B 2505/04* (2013.01)

(58) Field of Classification Search
CPC ............ B01D 39/1623; B01D 46/0036; B01D 53/0407; B01D 2239/0631; B01D 2239/10; B01D 2239/1225; B01D 2239/1233; B01D 2239/1291; B01D 39/083; B01D 39/1615; B01D 2239/0442; B01D 2239/1241; B01D 39/04; B01D 2239/025; B01D 2239/0407; B01D 46/30; D01D 5/003; D01D 5/0038; D01F 6/18; D10B 2505/04

USPC .............................. 96/142, 134, 413; 73/863

See application file for complete search history.

(56) References Cited

U.S. PATENT DOCUMENTS

| | | | | |
|---|---|---|---|---|
| 2010/0071554 A1* | 3/2010 | Pfeffer | ................... | B01D 39/06 95/275 |
| 2023/0201800 A1* | 6/2023 | Snapp-Leo | ............ | A41D 13/11 422/4 |

OTHER PUBLICATIONS

Zeinali, et al., "Free Versus Droplet-bound Aroma Compounds in Sparkling Beverages," Food Chemistry, 2022, vol. 378, pp. 1-6.

Zeinali, et al., "Needle-Trap Device Containing a Filter: a Novel Device for Aerosol Studies," Analytical Chemistry, 2021, vol. 93, pp. 14401-14408.

* cited by examiner

FLOW-THROUGH AEROSOL CAPTURE DEVICE

CROSS REFERENCE TO RELATED APPLICATIONS

This patent application claims the benefit of U.S. Provisional Application No. 63/154,755, filed Feb. 28, 2021; and of U.S. Provisional Application No. 63/273,991, filed Oct. 31, 2021. Both of these applications are incorporated by reference herein.

FIELD

This specification relates to a device for sampling aerosols and methods of directly desorbing sampled analytes into an analytical instrument.

BACKGROUND

The following paragraphs are not an admission that anything discussed in them is prior art or part of the knowledge of persons skilled in the art.

Aerosols are the suspensions of solid particles or liquid droplets in a gas medium. These small particles can have deleterious effects on the health of humans or the environment due to their small size and physiochemical properties. In addition, aerosol particles are capable of carrying other species such as pollutants, biomarkers or microorganisms (coronavirus, $E.\ coli$, etc.). For example, the airborne transmission of respiratory diseases generally occurs due to small droplets, which can remain suspended in the air for a long time. These features of aerosols underscore the importance of developing effective methods of analyzing them.

INTRODUCTION

The following introduction is intended to introduce the reader to this specification but not to define any invention. One or more inventions may reside in a combination or sub-combination of the apparatus elements or method steps described below or in other parts of this document. The inventors do not waive or disclaim their rights to any invention or inventions disclosed in this specification merely by not describing such other invention or inventions in the claims.

An aerosol is a suspension of fine solid particles or liquid droplets in air or another gas. The liquid droplets may be aqueous-based aerosol particles. Examples of natural aerosols include fog or mist, dust, forest exudates, and geyser steam. Examples of anthropogenic aerosols include particulate air pollutants and smoke. Aerosol particles may have diameters less than 10 μm, such as less than 2.5 μm. Aerosol particles with an effective diameter smaller than 2.5 μm can enter as far as the gas-exchange region in the lungs.

Most methods of analyzing aerosol are based on the chemical analysis of particles or their size distribution. However, since most gas-analysis methods measure concentrations of analytes in free format, particle-bound analytes often remain hidden in measurements. In the context of the present disclosure, "free analytes" or "analytes in free format" refers to analytes that are not bound to aerosol particles.

The particles in an aerosol sample contain a portion of the total available analytes in the sample. Particle trapping can be used to characterize the aerosol sample. Needle-trap devices (NTDs) can be used to characterize the analytes in an aerosol sample as they can sample and pre-concentrate free analytes in the gas, as well as trap the particles. Needle-trap devices have been previously disclosed in U.S. Pat. Nos. 6,481,301 and 7,479,390.

Some NTDs pack sorbents, such as sorbent particles, into a needle to create a trap that collects the aerosol particles. However, the particle-trapping efficiency of sorbent-packed NTDs is limited, especially for nanoparticle-sized aerosols.

In one aspect, the present disclosure provides a flow-through aerosol capture device that includes a chamber defining an airflow path, and a heat-stable aerogel filter, for example a heat-stable polymer aerogel filter, disposed in the airflow path for capturing aerosol particles when an aerosol-containing gas passes through the filter.

The flow-through aerosol capture device may be, for example, a needle-trap device or a thermal desorption liner.

In another aspect, the present disclosure provides a method of producing a heat-stable polyacrylonitrile (PAN) aerogel. The method includes: electrospinning PAN (preferably PAN having an average molecular weight of about 150,000 Da) to produce PAN fibers, preferably PAN fibers with an average diameter from 200 nm to 500 nm, such as an average diameter from 300 nm to 400 nm; cutting the PAN fibers, for example into fibers with an average length from about 0.5 mm to about 5.0 mm, preferably with an average length from about 1.0 mm to about 3.0 mm; freeze-drying the cut PAN fibers; and heating the cut PAN fibers to produce the heat-stable PAN aerogel.

In still another aspect, the present disclosure provides a method that includes sampling a gas using a flow-through aerosol capture device according to the present disclosure, where the gas includes aerosol particles, extracting an analyte adsorbed in the flow-through aerosol capture device using extraction fluid to desorb the analyte, and detecting the desorbed analyte. In some examples, flow-through aerosol capture devices according to the present disclosure may be used to trap aerosol particles that have an average diameter from about 5 nm to about 250 nm.

In yet another aspect, the present disclosure provides a heat-stable polymer aerogel that includes or consists of: fibers with an average diameter from about 200 nm to about 500 nm, preferably with an average diameter from about 300 nm to about 400 nm; fibers with an average length from about 0.5 mm to about 5.0 mm, preferably with an average length from about 1.0 mm to about 3.0 mm; fibers forming an aerogel having a density from about 3000 g/m$^3$ to about 4000 g/m$^3$, preferably from about 3500 g/m$^3$ to about 3700 g/m$^3$; fibers having a thermal stability from about 200° C. to about 350° C., preferably a thermal stability from about 280° C. to about 300° C.; fibers forming an aerogel filter having pressure drop from about 50 Pa to about 150 Pa, preferably from about 80 Pa to about 120 Pa; fibers with an average ratio of packing length:fiber diameter from about 25,000:1 to about 1,000:1, preferably with an average ratio from about 10,000:1 to about 2,500:1, such as about 5,700:1; or any combination thereof.

BRIEF DESCRIPTION OF THE DRAWINGS

Embodiments of the present disclosure will now be described, by way of example only, with reference to the attached Figures.

DETAILED DESCRIPTION

Figure 1:
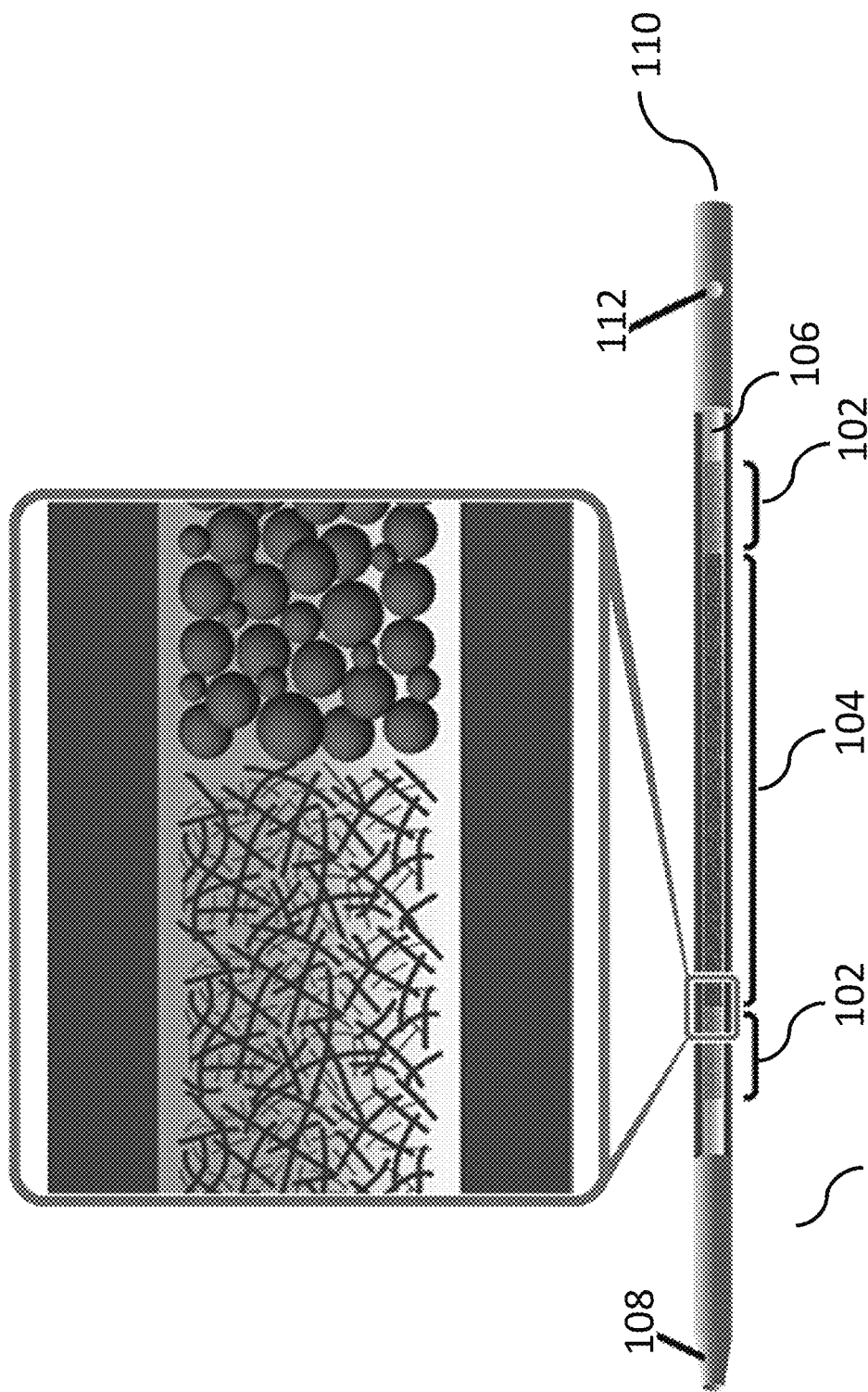
FIG. 1 is an illustration of an exemplary needle-trap device according to the present disclosure.

Generally, the present disclosure provides a flow-through aerosol capture device with a heat-stable aerogel filter, a method of producing a heat-stable polyacrylonitrile (PAN) aerogel, a method of detecting an analyte present in aerosol particles, and a heat-stable polymer aerogel.

In the context of the present disclosure, it should be understood that, in a "flow-through aerosol capture device", fluid is passed through a chamber that includes a heat-stable aerogel filter to capture aerosol particles from the aerosol-containing gas. Although a needle-trap device may use the cannular body of a needle to hold the heat-stable aerogel filter, it should be understood that other chambers may be used to flow sample gas past the heat-stable aerogel filter. For example, the lumen of a thermal desorption unit (TDU) liner may be used to house the heat-stable aerogel filter. Needle-trap devices are typically the correct size to fit a gas-chromatography injector. TDU liners are typically larger and allow for higher gas sample flow rates, but require TDU-specific gas-chromatography injection systems.

In the context of the present disclosure, it should be understood that an aerogel refers to a solid material of extremely low density, produced by removing the liquid component from a gel. The aerogel may be a microporous solid material that is at least 99.5% (v/v) air, such as at least 99.8% air. A heat-stable aerogel should be understood to refer to an aerogel whose chemical and physical features are stable at an elevated temperature, such as an aerogel that is capable of maintaining the aerogel structure when exposed to a temperature of 200° C. Some heat-stable aerogels according to the present disclosure may maintain their aerogel structure when exposed to a temperature of up to 350° C.

An aerogel filter according to the present disclosure may have one or more properties that are beneficial for filtering aerosol particles using a needle-trap device. Such properties may relate to efficiency of trapping aerosol particles, to gas flow rate through the needle-trap device during sampling, or to combinations thereof.

In some examples, an aerogel filter according to the present disclosure may be capable of capturing at least 95% of the aerosol particles passing through the filter while reducing the gas flow rate through the needle-trap device by less than 30% when compared to an otherwise identical needle that lacks the aerogel filter. In some specific examples, the aerogel filter may capture at least 95% of the particles that have an average diameter from about 5 nm to about 250 nm.

In one aspect, the present disclosure provides a flow-through aerosol capture device with a heat-stable aerogel filter, for example a heat-stable polymer aerogel filter. The device includes a chamber that defines an airflow path, and the heat-stable aerogel filter is disposed in the airflow path. The heat-stable aerogel filter captures aerosol particles when an aerosol-containing gas passes through the filter. The flow-through aerosol capture device may be adapted to connect to a gas-transfer device for drawing or driving the aerosol-containing gas through the filter.

The heat-stable aerogel filter may include a heat-stable polyacrylonitrile (PAN) aerogel, a heat-stable PAN/silica aerogel, a heat-stable polyetherimide aerogel, or a heat-stable polyamide aerogel, preferably a heat-stable PAN aerogel. The PAN may have an average molecular weight of from about 100,000 Da to about 200,000 Da, preferably about 150,000 Da. The heat-stable PAN aerogel may include cyclized PAN.

The cyclized PAN may include a polymer having monomers according to Formula (I) and/or Formula (II):

$$\left[ \begin{array}{c} \cdots \diagup \diagdown \diagup \diagdown \cdots \\ | \phantom{xx} | \phantom{xx} | \\ \cdots \diagdown N \diagup \cdots \end{array} \right]$$ Formula (I)

$$\left[ \begin{array}{c} \cdots \diagup \diagdown \diagup \diagdown \cdots \\ | \phantom{xx} | \phantom{xx} | \\ \cdots \diagdown N \diagup \cdots \end{array} \right].$$ (Formula (II))

In some examples, at least 50 mol %, for example at least 95 mol %, such as 98 mol %, 99 mol % or 100 mol %, of the heat-stable PAN aerogel are monomers according to Formula (I). In other examples, at least 50 mol %, for example at least 95 mol %, such as 98 mol %, 99 mol % or 100 mol %, of the heat-stable PAN aerogel are monomers according to Formula (II). In yet other examples, at least 50 mol %, for example at least 95 mol %, such as 98 mol %, 99 mol % or 100 mol %, of the heat-stable PAN aerogel are monomers according to Formula (I) and monomers according to Formula (II).

The heat-stable aerogel filter may include or consists of: fibers with an average diameter from about 200 nm to about 500 nm, preferably with an average diameter from about 300 nm to about 400 nm; fibers with an average length from about 0.5 mm to about 5.0 mm, preferably with an average length from about 1.0 mm to about 3.0 mm; fibers forming an aerogel having a density from about 3000 g/m³ to about 4000 g/m³, preferably from about 3500 g/m³ to about 3700 g/m³; fibers having a thermal stability from about 200° C. to about 350° C., preferably a thermal stability from about 280° C. to about 300° C.; fibers forming an aerogel filter having pressure drop from about 50 Pa to about 150 Pa, preferably from about 80 Pa to about 120 Pa; or any combination thereof.

The heat-stable aerogel filter may include or consists of fibers with an average ratio of packing length:fiber diameter from about 25,000:1 to about 1,000:1, preferably with an average ratio from about 10,000:1 to about 2,500:1. In a particular example, the average ratio of packing length:fiber diameter may be about 5,700:1.

The flow-through aerosol capture device may include a lumen, preferably where the lumen has a diameter from about 0.4 mm to about 0.8 cm, and at least one plug of the heat-stable aerogel filter in the lumen. When the device is a needle trap device, the lumen may have a diameter of from about 0.4 mm to about 0.7 mm. When the device is a TDU liner, the lumen may have a diameter of from about 0.3 cm to about 0.7 cm. The plug of the heat-stable aerogel filter may be up to 50 mm in length. The length of the plug of the heat-stable aerogel filter may be from about 0.5 to about 6 times the diameter of the lumen, such as about 4 times the diameter of the lumen. A lumen should be understood to refer to the inner open space or cavity of the flow-through aerosol capture device.

Needle-trap devices according to the present disclosure may additionally include sorbent particles, such as carboxen (CAR) particles, divinylbenzene (DVB) particles, 2,6-diphenyl-p-phenylene oxide particles (such as Tenax (TNX) particles), hydrophilic-lipophilic balance (HLB) particles, or polydimethylsiloxane/divinylbenzene (PDMS/DVB) particles, preferably with an average particle diameter from about 50 µm to about 300 µm, such as from about 150 µm to about 250 µm.

In some examples, the needle trap device includes a lumen holding the sorbent particles, preferably where the lumen has a diameter from about 0.4 mm to about 0.7 mm, and at least one plug of the heat-stable aerogel filter retaining the sorbent particles in the lumen, preferably where the length of the plug of the heat-stable aerogel filter is from about 2 to about 6 times the diameter of the lumen, such as about 4 times the diameter of the lumen.

The plug of the heat-stable aerogel filter may be from 0.5 mm to 30 mm in length, preferably about 2 mm in length; the lumen may be packed with from about 10 mm to about 30 mm of sorbent particles, preferably about 20 mm of sorbent particles; or any combination thereof.

The tip of a needle trap device according to the present disclosure may be frustoconical.

The heat-stable aerogel filter may include a heat-stable polyacrylonitrile (PAN) aerogel prepared by: electrospinning PAN to produce PAN fibers; cutting the PAN fibers; freeze-drying the cut PAN fibers; and heating the cut PAN fibers to produce the heat-stable PAN aerogel. The electrospinning, cutting, freeze-drying, and heating are discussed in greater detail below.

In another exemplary flow-through aerosol capture device, the lumen may have a diameter from about 0.4 cm to about 0.6 cm, and the plug of the heat-stable aerogel filter may be from about 0.25 cm to about 1 cm, such as about 0.5 cm.

In another aspect, the present disclosure provides a method of producing a heat-stable polyacrylonitrile (PAN) aerogel. The PAN aerogel may be used in a flow-through aerosol capture device according to the present disclosure. The method includes electrospinning PAN to produce PAN fibers, preferably PAN fibers with an average diameter from 200 nm to 500 nm, such as an average diameter from 300 nm to 400 nm; cutting the PAN fibers, for example into fibers with an average length from about 0.5 mm to about 5.0 mm, preferably with an average length from about 1.0 mm to about 3.0 mm; freeze-drying the cut PAN fibers; and heating the cut PAN fibers to produce the heat-stable PAN aerogel.

Electrospinning PAN may include: electrospinning a 5% to 10% (wt/vol), preferably 8%, PAN solution in a solvent, preferably dimethylformamide (DMF), electrospinning at a voltage of 15 to 20 kV, preferably about 17 kV, electrospinning at a flow rate of about 1.0 to 2.0 mL/h, preferably about 1.5 mL/h, collecting the fibers at a needle-to-collector distance of 15 to 25 cm, preferably about 20 cm, or any combination thereof. The PAN may have an average molecular weight of about 150,000 Da.

Cutting the PAN fibers may include: blending a liquid dispersion of the PAN fibers, such as blending using a kitchen blender at about 5,000 to about 20,000 RPM, preferably at about 13,000 RPM, using a liquid dispersion where the PAN fiber to liquid ratio is from about 50 mg/100 mL to about 500 mg/100 mL, for example from about 100 mg/100 mL to about 300 mg/100 mL, preferably about 200 mg/100 mL, using a liquid dispersion where the liquid comprises or consists of water, or any combination thereof.

Freeze-drying the cut PAN fibers may include: freezing at about −80° C. in a freezer, or flash-freezing in liquid nitrogen.

Heating the freeze-dried PAN fibers to produce the heat-stable PAN aerogel may include: heating the PAN fibers to cyclization conditions, such as to a temperature of about 280° C. for about 2 hours. The heating may be in an oxygen containing atmosphere.

In a particular example, the method includes: electrospinning an 8% (wt/vol) PAN solution in dimethylformamide (DMF) at a voltage of about 17 kV and at a flow rate of about 1.5 mL/hr to produce PAN fibers; collecting the PAN fibers at a needle-to-collector distance of about 20 cm; blending a liquid dispersion of the collected PAN fibers in a kitchen blender at about 13,000 RPM, where the liquid dispersion includes the collected PAN fiber and water in a ratio of about 200 mg/100 mL, to produce cut PAN fibers; freezing the cut PAN fibers about −80° C. in a freezer; drying the frozen PAN fibers under vacuum; and heating the freeze-dried PAN fibers in an oxygen containing atmosphere at a temperature of about 280° C. for about 2 hours to produce the heat-stable PAN aerogel.

In another aspect, the present disclosure provides a method of detecting an analyte present in an aerosol. The analyte may be a volatile or semi-volatile compound, for example a fragrance compound or a flavoring compound. The method includes: sampling a gas using a flow-through aerosol capture device according to the present disclosure, where the gas includes aerosol particles; extracting an analyte adsorbed in the flow-through aerosol capture device using extraction fluid, for example a heated carrier gas, to desorb the analyte; and detecting the desorbed analyte.

It should be understood that the expression "sampling" and "extraction" are synonymous in the context of capturing aerosols and free-analytes from the gas. The terms "desorption" and "extraction" are synonymous in the context of detection of the captured analytes. These terms refers to the removal of analytes from the flow-through aerosol capture device using an extraction fluid.

Sampling the gas using the flow-through aerosol capture device may include passing a sampling volume of the gas through the heat stable aerogel filter, where the sampling volume is preferably about 10 to 20 mL, and where the gas is preferably sampled at a flow rate from about 1 mL/min to about 50 mL/min, such as at a rate of about 5 mL/min. TDU liners, because of their larger cross-sections, may be used to sample the gas at higher flow rates than needle-trap devices.

The extraction fluid may be a gas, such as a heated extraction gas, or a liquid, such as an aqueous and/or organic solvent. Detecting the desorbed analyte may include detection using liquid chromatography/mass spectrometry (LC/MS), gas chromatography/mass spectrometry (GC/MS), or electrospray ionization/mass spectrometry (ESI/MS).

An exemplary needle trap device (NTD) according to the present disclosure is illustrated in FIG. 1. The illustrated NTD (100) includes two heat-stable aerogel filters (102) sandwiching a plurality of sorbent particles (104). The filters (102) and the particles (104) are held within the lumen (106) of the needle body. The illustrated NTD (100) has a frustoconical tip (108) at one end, and an open distal end (110). The illustrated NTD (100) also includes a side hole (112), which may be used during an extraction process to flow an extraction carrier gas through the filters and sorbent particles and out into a detector. The side hole (112) is covered during sampling.

Figure 2:
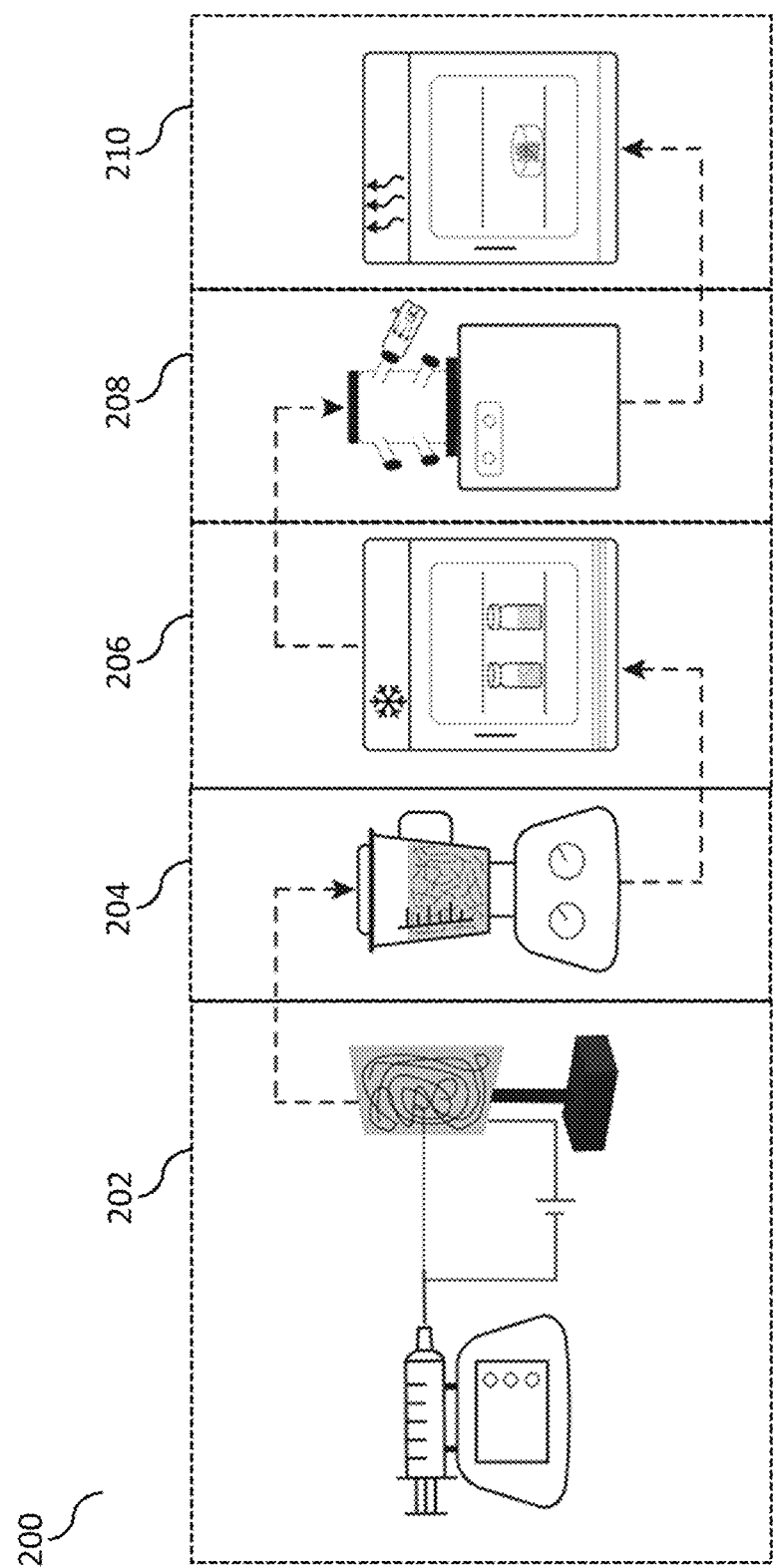
FIG. 2 is a schematic of a method for producing a heat-stable PAN aerogel.

A schematic of an exemplary H-PAN aerogel filter preparation method (200) is illustrated in FIG. 2. The method includes electrospinning (202) a PAN solution; cutting (204) a dispersion of the PAN fibers in a blender; freezing (206) the cut fibers; freeze-drying (208) the frozen PAN fibers to produce a PAN aerogel; and stabilizing (210) the PAN aerogel by heating the PAN aerogel to produce the heat-stabilized PAN. Two portions of the heat-stabilized PAN, along with sorbent particles, may be inserted into a needle to provide the NTD illustrated in FIG. 1.

Figure 3:
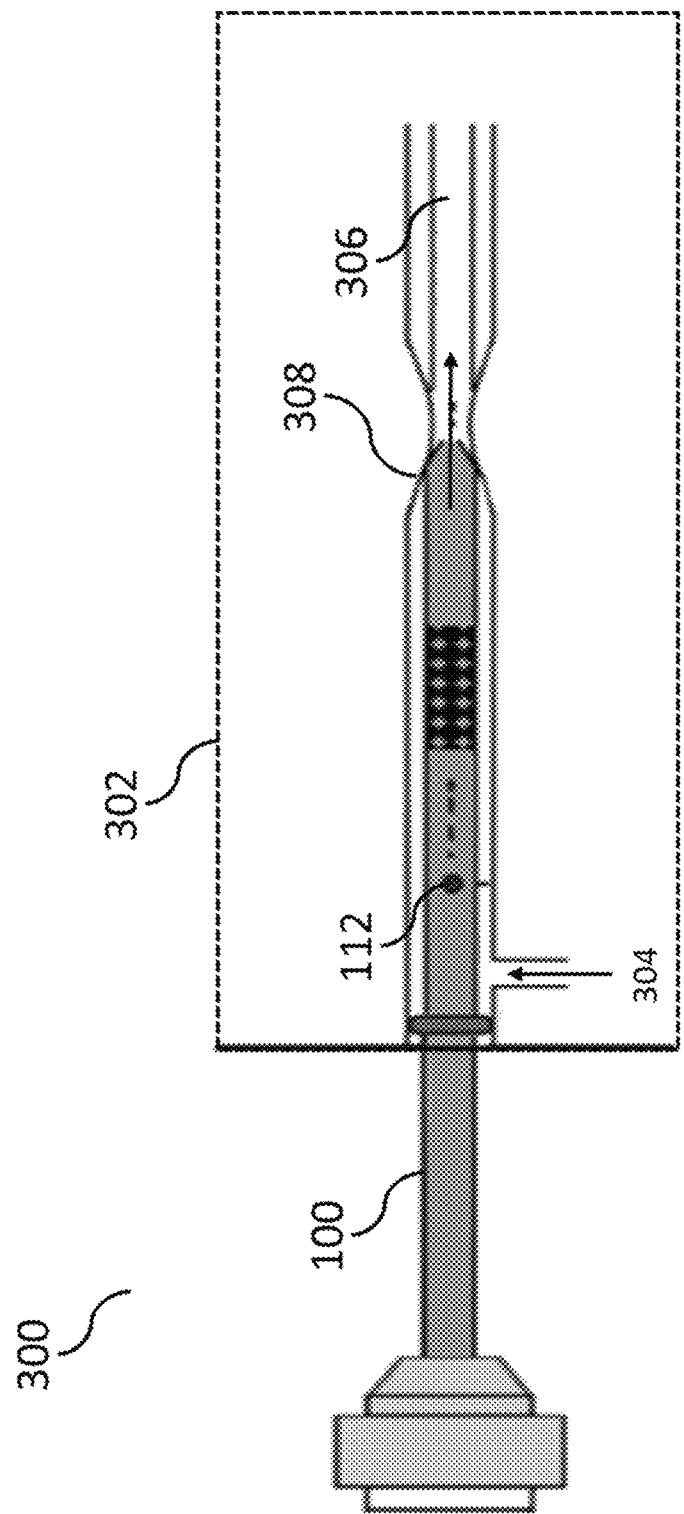
FIG. 3 is an illustration of an exemplary extraction arrangement.

FIG. 3 illustrates the NTD (100) of FIG. 1 in an exemplary extraction arrangement (300). The illustrated extraction arrangement includes a gas chromatograph (302) that is configured to accept the NTD (100). The gas chromatograph (302) directs a carrier gas (304) into the NTD (100) via the side hole (112). The carrier gas (304) passes down the lumen and through the heat-stable aerogel filters and sorbent particles, extracting analytes previously captured by the filters and sorbent particles. The carrier gas (304) is ejected from the frustoconical tip (108) and into a gas chromatograph column (306).

Figure 4:
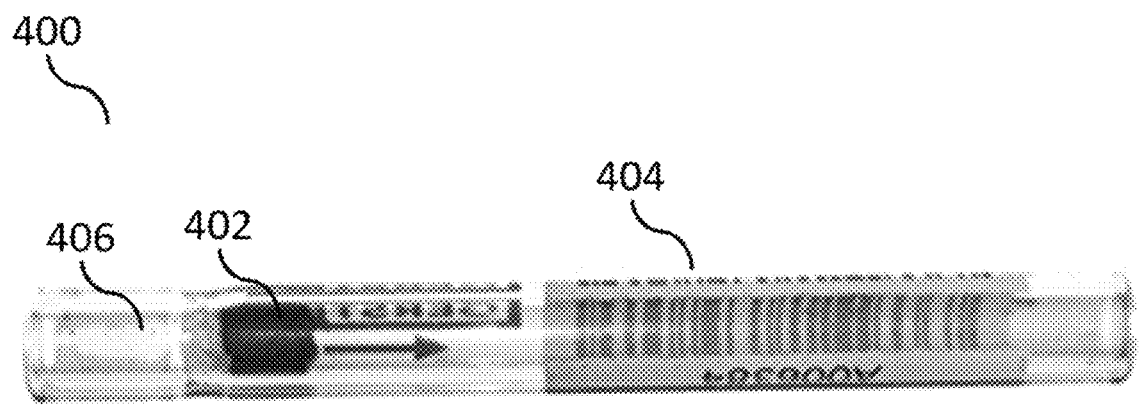
FIG. 4 is an illustration of an exemplary needle-trap device according to the present disclosure.

FIG. 4 illustrates a flow-through aerosol capture device (400) that includes about 0.5 cm of the H-PAN aerogel (402) in a thermal desorption unit (TDU) glass liner (404). The glass liner (404) is open at both ends and the H-PAN is (402) is held in place using a glass frit (406). The arrow illustrates the flow of gas during extraction. The carrier gas flows in the opposite direction of the arrow during desorption.

EXAMPLES

Materials and Instrumentation. Polyacrylonitrile (Mw=150,000), dimethyl formamide (DMF) (99.8%), carboxen (60/80 mesh size), benzene (>99.9%), 2-pentanone (99.5%), 1-nitropropane (98.5%), pyridine (99.9%), 1-pentanol (0.99%), octane (>99%), toluene (>99.8%), ethyl benzene (99.8%) and o-xylene (>99%) were purchased from Sigma-Aldrich (Mississauga, ON, Canada), while DVB (HayeSep Q® 60/80 mesh size), Tenax TA (60/80 mesh size) were obtained from Supelco (Oakville, ON, Canada).

The electrospinning instrument was constructed in-lab, and consisted of a syringe pump from Harvard Apparatus (Pump 11 Elite Infusion/Withdrawal Programmable (Massachusetts, USA) and a high voltage supplier from Spellman (New York, USA). All experiments used a 10 mL BD plastic syringe (New Jersey, USA) with an 18G syringe tip. A 10×10 cm piece of aluminium foil was used as collector, and high voltage was applied between needle tip and collector. The instrument was set inside a large plexiglass box to prevent any damage from the high voltages.

3% carboxen loaded thin-film microextraction (TFME) devices (3×20 mm) were prepared using an Elcometer 4340 film applicator (Elcometer Inc., Manchester, UK) in accordance with the procedure developed by Grandy et. al (Anal. Chem. 2016, 88, 3, 1760-1767).

Trapping efficiency was analyzed using a scanning mobility particle analyzer (SMPA) (TSI, Minnesota, USA), which featured an extra dry air tank connected to a constant output atomizer (TSI, 3076) with an atmospheric pressure output of less than 10 psig. The atomizer's output was connected to a diffusion dryer to remove humidity; the particles produced by the atomizer were directed into an electrostatic classifier (TSI, 3080) equipped with a neutralizer and an operating sheath flow of 15 L min$^{-1}$. Finally, the sorted particles were sent to a condensation particle counter (TSI, 3787) in 1.5 L min$^{-1}$ mode. For the tests involving solid particles, the atomizer solution was made up of 0.1 g NaCl dissolved in MiliQ water; for the oil aerosol experiments, 0.1 mL of linalool was dissolved in methanol. Under these normal conditions, the instrument should have a nominal generation rate of 2×10$^6$ particles per cm$^3$ (10$^8$ particles per second).

Sampling was conducted using a 1 L glass bulb (2-2144) from Supelco (Oakville, ON, Canada), and the flowrate measurements were obtained using a flowmeter from Aalborg (New York, USA). The aerogels were heated for 2 h under atmospheric pressure in an Isotemp™ Model 281A Vacuum Oven set to 280° C. A Vitamix 7500 blender (Cleveland, Ohio, USA) was used to cut the fibers, which were subsequently visualized via field emission-scanning electron microscopy (FE-SEM, Zeiss UltraPlus; Carl Zeiss Meditec AG, Jena, Germany). Quintron 750 mL breath bags with mouthpieces and 400 mL discard bags were purchased for the breath sampling tests. Solvent removal was conducted using a freeze-dryer (Labconco, Missouri, USA) with a collector temperature set to below −40° C. and a pressure of approximately 0.1 Torr. The freeze-milling instrument used in this research was an SPEX™ SamplePrep Freezer/Mill 115 (Toronto, Canada) that used liquid nitrogen as the main cooling source. 3-layered face masks (EnerPlex, Vietnam) and 100% silk face masks were used for breath sampling. The characteristics of the 3-layered face masks were as follows: shell layer, 100% polyester; middle layer, 65% polyester and 35% cotton; inner layer, 65% polyester and 35% cotton with Agion® antimicrobial agent. Pressure drop was measured using an Em201Spkit from UEI instruments (IN, USA).

The gas generator used in this research was fabricated in-lab, and consisted of a heating chamber and a flow regulator. Permeation tubes for each analyte were made by encapsulating pure analyte inside a 100 mm long (¼ in) Teflon™ tube sealed with 20 mm (¼ in) solid Teflon™ Swagelok caps. Emission rates for each permeation tube were verified by periodically monitoring weight loss in the individual analyte tubes. Both McReynolds and BTEX compounds were prepared in gas phase for this study, and temperature was kept constant at 75° C. with a 300 mL min$^{-1}$ air flowrate as a carrier for analytes.

With the exception of the analysis of real samples, all data was obtained via chromatographic separations on an the HP 5890 gas chromatography-flame ionization detector GC-FID (Hewlett-Packard company, CA, USA) were performed using a Rxi-5Sil MS (30 m×0.25 mm×0.25 µm) fused silica column from Restek with a nitrogen flow rate of 1 mL min$^{-1}$. The desorption temperature was set to 280° C. in split-less mode, and FID was held at a constant temperature of 300° C. during analysis.

GC-MS for thin-film analysis: TFME analysis was performed using an Agilent 6890A/5973C GC/MS (Agilent Technologies, CA, U.S.A.) coupled with a GERSTEL cooling injection system 4 and a TDU (GERSTEL, Mülheim an der Ruhr, GE). A GERSTEL multipurpose system 2 autosampler was utilized to perform automated injections into the membranes. Separation was conducted using a DB-5.625 capillary column (30 m×0.25 mm×0.25 µm) (Agilent J&W, Santa Clara, U.S.A), with helium (99.999%) at a flow of 1.2 mL min$^d$ being used as the carrier gas. The TDU desorption temperature program was initially set at 40° C. (30 s) and increased at 700° C. min$^{-1}$ to a final temperature of 280° C. The analytes desorbed from the membranes were cryofocused in the CIS 4 at −80° C. with liquid nitrogen; once desorption had been completed, the CIS was heated to 270° C. or 280° C. at 12° C. s$^{-1}$ in order to transfer the analytes to the column, and mass spectrometry detection was performed in scan mode with a mass range of 50-250 m/z using electron impact ionization at 70 eV.

GC-MS for needle-trap analysis: Analytes were separated using a Hewlett Packard 6890/5973 GC/MS equipped with a split/splitless injector and a SLBTM-5 MB (30 m×0.25 mm×0.25 µm) fused silica column from Sigma-Aldrich. Helium at a flow rate of 1 mL min$^{-1}$ was used as carrier gas. MS was conducted using the following parameters: electron ionization (EI) of 70 eV; an ion source temperature of 230° C.; a quadrupole temperature of 150° C.; and a transfer line temperature of 280° C. The instrument was run in full scan mode with mass range of 50-250 m/z.

GC temperature programs for the analysis of McReynolds and BTEX compounds:

TABLE 1

McReynolds GC temperature program

| Ramp (° C. min$^{-1}$) | Temperature (° C.) | Time (min) |
|---|---|---|
|  | 40 | 1 |
| 5 | 50 | 3 |
| 20 | 170 | 2 |

TABLE 2

BTEX GC temperature program

| Ramp (° C. min$^{-1}$) | Temperature (° C.) | Time (min) |
|---|---|---|
|  | 42 | 1 |
| 25 | 150 | 0.2 |
| 45 | 250 | 0 |

TABLE 3

Breath GC temperature program

| Ramp (° C. min$^{-1}$) | Temperature (° C.) | Time (min) |
|---|---|---|
|  | 40 | 2 |
| 10 | 100 | 0 |
| 20 | 200 | 0 |

Filter preparation and needle packing. In order to prepare the aerogel, PAN was electrospun. The resultant fibers were then cut into small pieces, placed in an appropriate dispersion media, and frozen. The final aerogel structure was obtained by removing the dispersion media via freeze-drying. The final product of this procedure is a highly porous aerogel.

Electrospinning: An electrospinning procedure was developed to obtain a constant flow of fiber from the needle to the collector. The electrospinning conditions were determined by testing different concentrations of PAN (8, 10, 15%) and various ratios of DMF and THF (0:1, 1:1, 2:1, 1:2, 1:0). All other influential parameters were kept constant during electrospinning. These tests identified a suitable electrospinning condition as: 8% PAN concentration w/v in DMF, an applied voltage of 17 kV, a flow rate of 1.5 mL h$^{-1}$, and a needle-to-collector distance of 20 cm. A 10 mL BD plastic syringe with a luer-lock tip (I.D. 14.5 mm) and an 18G needle tip were used in these tests.

Based on at least these experiments, the authors of the present disclosure expect that electrospinning could be accomplished using a 5% to 10% (wt/vol) PAN solution in a solvent, a voltage of 15 to 20 kV, a flow rate of about 1.0 to 2.0 mL/h, and a needle-to-collector distance of 15 to 25 cm.

Cutting: Two different fiber-cutting procedures were tested: freeze-milling and blending. In the freeze-milling method, the fibers were cooled with liquid nitrogen and then ground to small pieces by the fast back and forth movement of the container inside the instrument. The freeze-milling instrument was set to pre-cool for 2 min, followed by a 1 min run time with different (2, 4, and 6) cycle repetitions at a rate of 15 cpm. Three different conditions were tested for the freeze-milling method: fibers without any solvent, fibers with methanol, and fibers with water (0.02 g fibers and 4 mL solvent).

PAN fibers were cut with and without solvent using a freeze-milling instrument; however, the resultant fibers were not uniform in structure, and appeared to be crushed rather than cut.

The other cutting procedure utilized a kitchen blender and the addition of a liquid dispersion media. The selected dispersion liquid should allow the fibers to be suspended for a rather long time in order to ensure homogeneous cutting procedure. After cutting in the blender, the suspension must be frozen; the final aerogel's homogeneity and porosity is highly dependent on the properties of the suspension. As such, different dispersion media (methanol, 1,4-dioxan and water) were tested to determine which one yielded the most stable suspension. The findings indicated that water offered uniform and stable suspension up to several months.

Since the fiber-to-dispersion media ratio (w/v) can also affect both cutting efficiency and the porosity of the final aerogel, this ratio was also tested. To this end, the blender was set to level 6 (around 13000 rpm) for one or two 5-minute blending cycles. The aerogel was prepared under eight tested conditions (200, 400, 600, or 800 mg of fiber/100 mL of dispersion liquid; each cut for 5 or 10 minutes). Other experiments tested a fiber-to-dispersion media ratio from 10 mg/100 mL water to 1000 mg/100 mL water. Blending about 50 mg of fiber/100 mL water to about 500 mg of fiber/100 mL water produced acceptable aerogels.

To check the quality of the final product, the aerogel's structure (flexibility/fragility/homogeneity) was tested visually, and its filtration efficiency was tested using SMPA instrument. Based on the aerogel's physical properties (not shown) lower ratios (200 mg/100 mL) enable more flexibility and uniformity, while blending time does not seem to have influence. Furthermore, the results of the filtration efficiency tests (not shown) showed no significant differences. Ultimately, blending 200 mg fiber/100 mL water for 5 minutes at ~13000 rpm was used for further studies.

Based on at least these experiments, the authors of the present disclosure expect that the blending could be performed at about 5,000 to about 20,000 RPM, and using a PAN fiber to liquid ratio is from about 50 mg/100 mL to about 500 mg/100 mL.

Freeze-drying: To remove the dispersion liquid and obtain the final aerogel, the fiber/dispersion agent suspension were frozen. After cutting the fibers in a blender, the suspension was transferred to plastic vials. The vials were frozen using both instant freezing with liquid nitrogen and storing them in a freezer at −80° C. to determine whether the freezing conditions influenced the physical properties of the final aerogel. The frozen suspensions were then transferred to the freeze-drying instrument and left for 24 h. Solidification in freezer resulted in better physical structure.

Heating: Heating the PAN aerogel increases stability and helps the aerogel avoid melting. Heating the PAN aerogel in an air atmosphere may result in shrinking the aerogel and/or reducing the fiber's diameter. Heating the PAN may also result in cyclization and optionally dehydrogenation. Heating also causes the white-colored PAN fibers to become brown in color. Heated PAN aerogel may be referred to as H-PAN.

Two heating conditions were studied: heating right after electrospinning, and heating after freeze-drying. The first batch of electrospun fibers were heated in an oven at 280° C. for 2 hours prior to cutting in the blender. Once again, different fiber-to-solvent ratios (200, 400, 600, and 800 mg PAN fiber per 100 mL dispersion media) and blending times (5 and 10 minutes) were investigated. The second batch of fibers was heated in an oven at 280° C. for 2 h after freeze-drying in order to obtain heated brown-colored PAN aerogel (H-PAN). Heating the fibers after electrospinning, and before freeze-drying, did not successfully produce an aerogel (not shown).

Needle-packing. In some studies, the H-PAN filter was packed inside the needle. In the aerosol analyses, an H-PAN filter with commercial sorbent particles was packed inside the NTD. The needle tip was sharpened to hypodermic shape during packing and then after needle preparation, it was cone-shaped to improve its desorption capabilities during the NTD's final application.

Needles were either packed with aerogel filter (with and without other commercial sorbent particles) (Group I), or packed only with sorbent particles (Group II). For Group II, extended-tip needles were used to pack particle sorbents into the needles, and springs were inserted before and after the sorbent inside the needle to ensure that the particles remained in place.

The tips of the needles in Group I were initially sharpened to hypodermic tip to facilitate packing procedure. The sharp tips were inserted into the aerogel to extract a small piece, which was then pushed into the needle with small plunger. This procedure was repeated until the aerogel filter had reached its desired length. In the conditions where sorbent particles were added into the needle, the needle was first packed with one plug of filter and then sorbent particles were poured into the needle until the desired length had been achieved. Once the desired length had been achieved, another filter plug was packed into the needle. Thus, the sorbent particles were sandwiched between two filter plugs, which act both as filters and as plugs that keep the sorbent particles inside of the needle. After packing was completed, the sharpened tip was cut and removed, and a cone-shaped tip was fabricated using a metallic grinder. A cone-shaped tip, also referred to a frustoconical tip, can improve the desorption efficiency of NTDs with narrow-neck liners in the GC injector.

Characterization. In order to investigate the prepared filter's physical properties, scanning electron microscopy (SEM) was employed to visualize the fiber. Thermogravimetric analysis (TGA) was applied to analyze the thermal behavior of the PAN and H-PAN fiber. The fibers were heated to between 25-600° C. at 10° C. $min^{-1}$ in an $N_2$ atmosphere, with weight loss being measured as a function of temperature.

The SEM micrographs indicate that the diameters of PAN and H-PAN are around 300-400 nm. Generally, the structures of the fiber and aerogel do not change after heating, which proves that the fiber is thermally stable at high temperatures.

The thermal stability of PAN and H-PAN were further studied using TGA. The results of the TGA analyses for both aerogels were obtained under an $N_2$ atmosphere, which causes PAN fibers to undergo cyclization. This reaction is the result of a side-chain rearrangement that does not change the polymer mass. In brief, while PAN chains undergo a chemical reaction, the resultant changes cannot be captured by TGA data because the polymer's molecular weight remains unchanged.

The obtained results indicate that both aerogels are relatively stable up to 300° C. under these conditions. At higher temperatures the PAN fiber start losing weight at a higher rate; however, this weight loss occurs much more slowly for H-PAN as a result of undergoing a stabilization process. Both aerogels maintain a large percentage of their weight up to 600° C., as carbon fiber, which is highly thermally stable, forms at these temperatures.

Background analysis. A freshly prepared needle was packed with 2 mm of H-PAN filter in order to assess the background from the H-PAN filter. The packed needle was then conditioned in a GC injector at 280° C. for 30 min, at which point the temperature was increased to 300° C. while the conditioning continued for another 30 min. To study the background from filter, the injector temperature was set to 320° C., the needle was inserted into the GC inlet (without sampling), and desorption was performed for 3 min. This procedure was repeated several times at different temperatures. To ensure a robust comparison, system background was assessed by running the instrument in the same conditions and without any injection. The GC column temperature program began at 40° C. and was increased to 300° C. in order to cover all possible temperature ranges.

The results showed no additional peaks. For comparison, a chromatogram was obtained from the instrument in similar conditions without any injection. The results of this test indicated that the prepared H-PAN filter provided a clean background for analysis and did not produce any interfering peaks during desorption.

Quality of filter. The quality of the filter was assessed. Improved performance is achieved by increasing particle trapping and reducing pressure drop across the filter. Given these factors, quality factor (Qf) is defined as:

$$Q_f = -\frac{\ln(1-E)}{\Delta p} \quad \text{Eq. 1}$$

In this equation, E refers to collection efficiency and $\Delta p$ is the pressure drop across the filter. To calculate the quality factor and study how it changes over time, prepared H-PAN filter was cut into cylinders in accordance with ASTM D6830-02(2016). The filtration efficiency was calculated based on detector particle count before and after inserting the filter into the instrument, while the pressure drop was measured by connecting fittings on either side of the filter holder. Pressure drop was monitored and recorded during the experiment. To study how filtration efficiency changes over long sampling times, a particle generator was used to continuously introduce particles into the filter bed, with filtration efficiency being measured every 2 h, and pressure drop being recorded accordingly. This procedure was conducted for 12 h, and was repeated 3 times.

The obtained results showed that the filter's quality factor was acceptable in comparison to previously reported values (~0.07-0.1 $Pa^{-1}$). Furthermore, the filter's quality factor did not decrease substantially after being fed with solid particles for 12 h, thus confirming its high capacity. These results confirm that the developed filter can be used to trap particles over a long period of time. The filter's high capacity is especially important when working with samples with low concentrations of analytes that require high sampling volume. Quality factor of H-PAN and pressure drop across the filter over time (average values) are shown below:

TABLE 4

| Feeding Time (h) | E | Δp (pa) | Qf (Pa$^{-1}$) |
|---|---|---|---|
| 2 | 0.99926 | 99 | 0.0728 |
| 4 | 0.99963 | 99 | 0.0798 |
| 6 | 0.99972 | 106 | 0.0772 |
| 8 | 0.99977 | 109 | 0.0769 |
| 10 | 0.99976 | 123 | 0.0678 |
| 12 | 0.99989 | 119 | 0.0766 |

Packing length for NTD. The stability of needles packed at different lengths (1, 2, 4, 6 mm) was tested by performing extractions of toluene, ethylbenzene, and o-Xylene (TEX). Sampling was performed in an aquatic headspace using a 5 mL min$^{-1}$ flowrate for 10 minutes and an analyte concentration of 200 μg L$^{-1}$. The results of these tests revealed that a length of 1 mm was unstable in the tested extraction/desorption conditions, but lengths of 2, 4, and 6 mm provided repeatable results.

The same procedure, using a 2 mm packing length of H-PAN aerogel filter, was repeated for 12 days over a 2 months span while monitoring the extraction efficiency. In total, 94 extractions were performed with filter over this time period in order to assess its stability over time. The extraction signals showed the H-PAN filter's high stability at high temperatures and sample flows.

The same gas generator system was employed to determine whether the presence of the particles altered the filter's extraction efficiency/stability, but the tubes in these tests were filled with benzene, toluene, ethylbenzene, and o-Xylene (BTEX). The SPMA particle generator added particles at a rate of 1E8 particles per second. Both the aerosol particles and generated gas were connected to a 100 L plexiglass box equipped with a fan to mix the particles and gas samples prior to sampling. The output from the plexiglass box was passed through a 1 L gas sampling bulb for sampling via the septa. Sampling was conducted at 5 mL min-1 for 2 h, with a total of 15 extractions (total of 9 L sample was drawn to needle) being performed.

To ensure that the particle and gas samples were both present inside the gas sampling bulb, the waste output was connected to the SMPA, and the particle counts were compared to those obtained under normal instrumental conditions. No significant signal drop was observed, confirming that there is no leak in the connection. In addition, no significant difference was observed when the BTEX signal was compared to the expected standard concentration signal.

Filtration efficiency studies. The filtration efficiency of the prepared filters was evaluated using a scanning mobility particle analyzer (SMPA). In this instrument, particles (5-225 nm, average particle size of about 30 nm) were generated in particle generator and then transferred into an electrostatic classifier to be sorted based on size. After being sorted, the particles were counted by a condensation particle counter. Filtration efficiency was determined by inserting a filter into the instrument (after the particle generator and before the particle classifier), with the difference in particle count before and after insertion into the system being taken as the measure of filtration efficiency.

To test filter preparation, fibers were packed in rather large tubing (I.D.=4 mm, length=90 mm), which was in turn packed (10 mm) with prepared filter aerogel (PAN or H-PAN). The particles were then counted and compared to the blank particle count obtained prior to inserting the filter.

The results showed that the particle count decreased significantly in both the PAN- and H-PAN-packed filters, with both showing filtration efficiencies of more than 99%. This result exemplifies the prepared aerogel's high filtration capacity, and confirms that high temperature treatment does not affect filtration efficiency.

To check if smaller needles provided the same filtration efficiency as larger needles, prepared aerogels were packed (packing length=2 mm) in needles with commonly used gauge sizes for NTD: 19G (with O.D.=1.067 mm) and 22G (O.D.=0.717 mm applicable inside normal GC injectors). The main problem with using small packed tubing in conjunction with an SMPA is that small needles are incapable of providing the high flowrate required by the instrument. To solve this problem, multiple needles were packed in parallel to compensate for the low flowrate afforded by single tubing. Specifically, 4 of the larger needles (19G) and 6 of the smaller needles (22G) were packed in parallel. The same procedure was employed to investigate the filtration efficiency of the final needles, which were packed with both aerogel filter plugs and sorbent particles. To this end, multiple needles were prepared by packing both filter plugs (2×2 mm) and 20 mm of sorbent particles between them. Their filtration efficiency was then measured using both solid NaCl particles and oil droplets (both produced in particles sizes of 5-225 nm) as analogues for solid and liquid droplets in aerosol samples.

The data showed that the prepared H-PAN aerogel filter provided high filtration efficiency (>99%) for both solid particles and liquid droplets. The filtration efficiencies were obtained using needles packed with commercial sorbent, which were compared to needles containing an H-PAN filter (2×2 mm) and only sorbent particles (20 mm). The filtration efficiency was as low as 50% in the absence of a filter, but >99% when the H-PAN filter was inserted, thus making the aerogel filter suitable for filtration applications. The aerogel filter provided filtration efficiency that was >99.9% the same as commercial filters.

It should be mentioned that filtration mechanism theory states that the lowest filtration efficiency should occur for particles between 100-200 nm, which were included in the size range chosen for this study. Thus, it can be concluded that, when high filtration efficiency is achieved in this size range (the range with the lowest efficiency), even higher filtration efficiencies can be expected in other ranges. Furthermore, it is also known that larger particles are easier to trap than smaller ones.

Flowrate measurement. An appropriate filter for an NTD should offer permeability that is sufficient to enable acceptable flowrate and dynamic sampling. To compare the performance of the prepared aerogel with commercially available sorbent particles, different NTDs were prepared with 20 mm of Carboxen (CAR), divinylbenzene (DVB), Tenax (TNX), and hydrophilic-lipophilic balance (HLB) particles, and two additional NTDs were prepared with either 2 or 20 mm of H-PAN. Nitrogen was passed through the needle at a constant pressure, and the output flowrates were measured and compared. These conditions are provided below.

TABLE 5

| Packing Material | Flowrate (mL min$^{-1}$) | Packing Material | Flowrate (mL min$^{-1}$) |
|---|---|---|---|
| 20 mm CAR | 17.5 | 20 mm DVB | 13.2 |
| 20 mm HLB | 15.6 | 20 mm H-PAN | 13.5 |
| 20 mm TNX | 14.7 | 2 mm H-PAN | 45.2 |

The resultant flowrates indicate that the aerogel's permeability is comparable to previously developed sorbents at similar lengths. As expected, the flowrate was higher at the optimum packing length (2 mm), and therefore cannot be a limiting factor for extraction purposes.

Filter extraction efficiency and breakthrough volume. The prepared H-PAN aerogel's primary function is as a filter that traps particles; however, its polymeric structure also allows it to function as an extraction substrate. Filter plugs with high filtration efficiency and low extraction capacity may be desirable for some NTDs since, in some exemplary NTDs, sorbent particles are responsible for extraction purposes, and lower extraction by the filter prevents interference with sorbent function.

When an extraction system is considered to be exhaustive, it is important to monitor breakthrough volume (BTV). In exhaustive sampling, all analytes are extracted from the sample, which means that the extraction signal can be enhanced by increasing the extraction volume. However, the extraction capacity is not unlimited. When the device reaches its capacity, the extraction signal becomes constant regardless of further increases to the extraction volume. This volume should be considered, as the loss in linearity between concentration and signal following BTV can affect important parameters such as calibration range.

To investigate the H-PAN aerogel's extraction efficiency and BTV, McReynolds compounds with different chemical properties (benzene, 2-pentanone, 1-nitropropane, pyridine, 1-pentanol, and octane) were selected. For this study, needles packed with 20 mm of CAR, TNX, DVB, HLB, and H-PAN, as well as 2 mm of H-PAN (2 mm was found to be a suitable packing length for needle preparations) were used to extract McReynolds compounds, with constant gas concentration and flowrate being provided by a gas generator system. The permeation tubes were filled with McReynolds compounds and left in the heating chamber of the gas generator, and the generator's output was passed through a 1 L gas sampling bulb. An extraction time of 20 min was selected to assess extraction efficiency. For BTV, different volumes of sample were drawn through the NTD using a pump (flow rate=10 mL min$^{-1}$). To determine break-through volume, sample volume was increased until the extraction signal remained constant.

The extraction capacity of the 20 mm H-PAN filter was determined to be approximately 7-21% of commercial sorbents at a similar length. The extraction efficiency of the small plug packing size of H-PAN (2 mm) falls 0.6 to 4% of the commercial sorbents. These low extraction capacities are appropriate for NTD filtration applications that use sorbent particles for extraction purposes.

The BTV results for the needles packed with 2 mm and 20 mm of H-PAN, as well as those for various commercial sorbents, are shown below. According to the obtained results, the BTV value for the H-PAN filter was much lower than the value for the commercial sorbents at the same packing length. Similarly, the H-PAN plug packed to 2 mm also returned lower BTV values, which indicates that it does not effectively retains free volatile analytes. Rather, these analytes are extracted by the sorbent, while particles are trapped in the filter.

TABLE 6

| | 20 mm TNX | 20 mm CAR | 20 mm DVB | 20 mm HLB | 20 mm H-PAN | 2 mm H-PAN |
|---|---|---|---|---|---|---|
| Benzene | 573 | 509 | 593 | 575 | 105 | 41 |
| 2-pentanone | 531 | 1198 | 585 | 1020 | 66 | 37 |
| 1-nitropropane | 568 | 540 | 590 | 498 | 75 | 34 |
| pyridine | 536 | 1176 | 587 | 1267 | 76 | 23 |
| 1-pentanol | 581 | 502 | 603 | 658 | 82 | 39 |
| octane | 553 | 1087 | 584 | 1094 | 51 | 30 |

Particle trapping behavior. The data for multiple extraction point demonstrates the filter's stability in extraction/desorption conditions. In addition, its functional stability in the presence of particles in aerosol samples was also tested since particle trapping can clog the filter input, which can result in decreased extraction due to the resultant reduction in the sampling flowrate.

Multiple BTEX extractions in the presence of NaCl nano-particles provided repeatable results. These data confirm that multiple cycles of particle trapping via desorption did not clog the filter, thus allowing it to produce reproducible data in aerosol environments.

Proof of concept and applications. A breath analysis procedure was used as a proof-of-concept. In brief, eucalyptol was chosen as a model analyte, and was analyzed by subjecting breath samples from healthy volunteer who had been chewing eucalyptus gum to NTD and TFME. Sampling was performed in breath bags and the concentration of eucalyptol was measured with two methods (NTD and TFME). To check whether the measurements were influenced by the presence of droplets, sampling was repeated while the participant was wearing a silk mask or a 3-layered mask. These masks were chosen based on previous findings related to particle trapping efficiency, which identify them as exemplars of strong and weak masks.

For breath analysis, a healthy volunteer was asked to chew a piece of eucalyptus gum (purchased from local market) for 30 minutes, and then to provide a breath sample by blowing into a breath-sampling bag. Additionally, samples were acquired while the volunteer was not wearing a mask, or was wearing either a 3-layered mask or a silk mask. A standard gas sample was prepared in a 1 L glass gas sampling bulb for calibration. The bulb was washed with methanol, dried, and then vacuumed with a pump. After vacuuming, 1 μL pure standard of eucalyptol was injected into the glass bulb to obtain a 146 ppm standard. Different volumes of standard gas sample were drawn with a gas-tight syringe and spiked into blank breath samples to produce the desired eucalyptol concentrations. A linear dynamic range of 1.2-490 μg $L^{-1}$ was calibrated with each method separately. For NTD, breath samples were drawn through a needle with a flowrate of 10 mL $min^{-1}$. For TFME, extraction film was inserted and maintained inside the breath bag for 30 minutes in order to reach equilibrium. After extraction, the devices were transferred into the GC desorption inlet and separated using the temperature program detailed above. It worth noting that the retention times (depicted in the following chromatograms) for TFME and NTD were slightly different for eucalyptol, as each of them were analyzed in separate instruments.

The results are shown below:

TABLE 7

| | eucalyptol detected by NTD (µg L$^{-1}$) | eucalyptol detected by TFME (µg L$^{-1}$) |
|---|---|---|
| 3-layer mask | 178 ± 10 | 180 ± 9 |
| silk mask | 201 ± 6 | 173 ± 4 |
| without any mask | 243 ± 8 | 171 ± 10 |

The obtained results indicated that NTD detected significantly higher concentrations of eucalyptol compared to TFME in the no-facemask samples, the difference between the two methods decreases for the data obtained when the volunteer wore a silk mask, as silk masks are considered to be weak shields against droplets with filtration efficiencies around 50%. However, the concentrations detected by both methods for the samples captured through highly efficient masks were quite similar. It can be explained as follows; this result indicates that the higher concentration of eucalyptol extracted by NTD in the "no-mask" breath sample was the result of capturing droplets that contained dissolved eucalyptol. This is the reason for similar concentrations when breath samples were obtained using a 3-layered face mask (filtration efficiency >99%), as the droplets are blocked in face mask and were not present in sampling bag. In contrast, the weak silk face mask was able to block approximately half of these droplets, which is reflected in the results. Based on the results, it is safe to say that the 3-layered face mask successfully blocked all of the droplets, which further indicates that eucalyptol is only present in breath samples in free format. In this case, only free gas-phase eucalyptol is available for extraction with NTD; however, in all cases, TFME is only capable of extracting free analytes (regardless of presence or absence of aerosol droplets). This explains the similarity between the eucalyptus concentrations obtained by TFME in all conditions.

NTD Compared to TFME and Solid-Phase Microextraction (SPME).

In the experiments discussed below, three extraction methods were chosen and compared for measuring the free and total concentration of fragrance compounds in several sprays. The tested compounds were: α-pinene, β-pinene, limonene, benzyl alcohol, γ-terpinene, linalool, citronellol, geraniol, cinnamaldehyde, thymol, indole, eugenol, isoeugenol, benzyl benzoate, and benzyl salicylate.

The H-PAN aerogel and NTDs were prepared as discussed in the above experiments.

For determination of free concentration, thin-film microextraction (TFME) and solid-phase microextraction (SPME) were chosen. Both of these extraction devices were exposed to the sample environment for a specific amount of time to be equilibrated. The analytes (fragrance compounds) can be physically adsorbed on the surface of TFME or SPME based on the interaction between extraction phase and analytes. The amount extracted is proportional to the concentration in the sample. The difference between TFME and SPME are mainly surface area and device designs. Based on the low mobility of large droplets in sprays, these extraction methods can represent the concentration in gas phase only.

For determination of total concentration, a needle-trap device (NTD) was used. NTDs are the better option for determining the total exposed concentration of fragrant and aroma compounds since their filtration capability enables the trapping of aerosol droplets and the extraction phase adsorb gas-phase analytes. Additionally, drawing sample through packed needle enhances the filtration efficiency by increasing the mobility of droplets and forcing them to pass through the packed needle with filter. The droplet-trapping ability of NTDs is particularly helpful for detecting less-volatile compounds that preferentially remain inside water/alcohol aerosol droplets. Trapping the aerosol particles enables the further analysis of the analytes, which is not possible in TFME and SPME.

In these experiments, the NTDs included 1 cm of HayeSep™ DVB particles (60-80 mesh) sandwiched between the two 2 mm of H-PAN filter.

The thin films were prepared by using polydimethylsiloxane (PDMS) to adhere DVB particles to carbon mesh thin-film membranes following the procedure detailed in Anal. Chem. 2016, 88, 3, 1760-1767. The thin films were cut into rectangles measuring 4×0.5 cm for extraction purposes. DVB/PDMS-arrow devices (1.10 mm, 20 mm, 120 µm) were purchased from CTC Analytics AG (Zwingen-Switzerland). For simplification, the term "SPME" is used instead of "SPME-arrow".

All extraction devices were conditioned at 280° C. for at least 1 h for clean-up and conditioning prior to the extraction step.

Gas mixture preparation. Gas mixtures for the different fragrance compounds were prepared by filling tubes with pure analytes and leaving them in the chamber of a gas-generator instrument. The gas-generator chamber was equipped with a thermostat, which allowed the temperature to be tuned, and it was connected to an input and output, allowing the carrier gas to transfer the gas-phase analytes to the desired sampling container. The weight of the tubes was monitored regularly to calculate their permeation rate. The required concentration of analytes in the gas phase was prepared by altering the temperature and/or flowrate. For the experiments, the concentration of analytes was set between 40-60 µg L$^{-1}$. It should be mentioned that due to different permeation rates (depending on the volatility of compounds), it is practically impossible to obtain exactly the same concentrations for all analytes at a definite temperature and flowrate.

Sampling procedures. Three different sampling methods were developed based on the extraction-phase designs. Sampling was performed using a glass sampling bulb with a hole that was connected to the output of the gas generator.

For the NTD, the tip of the needle was inserted into the green septa, while the end was connected to a sampling pump, which was turned on during sampling (flowrate=30 mL min$^{-1}$) to draw the sample through the sorbent bed. After sampling, the needle was disconnected and inserted into the injector of the GC-MS instrument for desorption.

Figure 5:
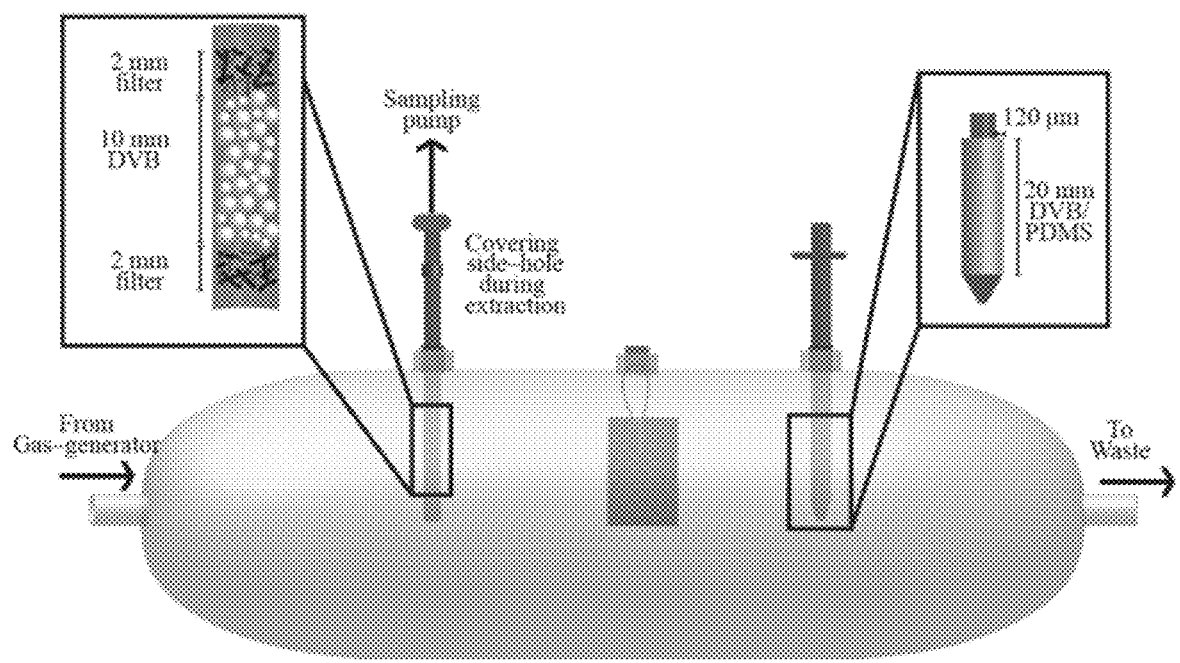
FIG. 5 is a schematic of a sampling chamber used to test NTDs, TFME devices and SPME devices.

In contrast, the thin film and SPME were inserted into the sampling glass and left there until extraction time. After sampling, the devices were transferred into the GC-MS instrument for desorption and separation of analytes. A schematic of the sampling chamber for each device is shown in FIG. 5. While each device was used separately, the combined chamber is shown to simplify the visualization of the sampling procedure.

The sampling flowrate and temperature were controlled to closely replicate the air in a real room.

Carry-over. To study the carry-over after each NTD and SPME extraction, the desorption time was varied from 1-5 minutes. After each desorption, the extraction device was then re-desorbed to examine the remaining compounds on the extraction phase. A carry-over signal of 5% or less than extraction signal is generally considered acceptable and the desorption conditions can be considered appropriate.

The carry-over effect for TFME was investigated by re-desorbing from the same thin-films after an extraction/desorption cycle. The same procedure was repeated after the application of spray sample.

The results indicated no carry-over for desorption times of up to 3 minutes; thus, a desorption time of 3 minutes was used for all analyses using these devices. For TFME, the designed desorption method detailed in the Supplementary Information resulted in carry-over of less than 5%; as such, this method was used for all subsequent TFME analyses.

Equilibrium time for SPME and TFME. Identifying the equilibrium time is vital when using equilibrium-based extraction methods, such as TFME and SPME. For these methods, it is important to make sure that the extraction time is in the equilibrium or pre-equilibrium region, as the monitoring of the exact extraction time becomes more important in decreasing the standard deviations of signals when it is in the pre-equilibrium range. A gas generator was used to prepare the gas-phase samples used to measure the equilibrium times for TFME and SPME. The gas analytes were transferred to a glass with a septum-sealed hole for sampling, and the carrier gas containing the analytes was then sent to the waste. The extraction devices (thin film and arrow) were left inside the sampling glass for a known amount of time, and the extraction signal was monitored until it remained constant despite further increases to the extraction time.

Extraction times for NTD, SPME and TFME. As explained above, the BTV measurement is important in assessing the capacity of the NTD. The results suggests that BTV is not reached for any of the compounds up to at least 500 mL. Based on these results, it can be concluded that BTV is not reached for any compound after 3 minutes of sampling (flowrate=30 mL min$^{-1}$); therefore, 3 minutes was selected as the extraction time for the NTD experiments.

For TFME and SPME, equilibrium time was studied by varying the extraction time until equilibrium had been achieved. The results of these tests demonstrated that it took up to 45 minutes for some compounds to reach equilibrium. The final goal of this project was to determine and compare the concentration of fragrances (in gas phase and droplet-bound) in air samples at various time intervals after the application of sprays. The concentration of fragrances after spraying is not constant and decreases over time, which means it is highly impractical to wait until equilibrium after spraying. In addition, it was important to monitor changes of fragrance concentration over time, so if the extraction is conducted until the equilibrium point is reached, the data regarding changes in concentration over time will be lost. To solve these problems, the pre-equilibrium condition was used for extraction, and a 3-minute extraction time was chosen for calibration and real sample analysis with TFME and the SPME.

Absolute recovery for TFME and SPME. To provide a more complete comparison of the methods developed in this study, absolute recovery values for the equilibrium-based extraction methods were calculated. To this end, the SPME and thin-film devices were exposed to samples with known analyte concentrations, and the extracted amounts were calculated in nanograms. Absolute recovery was calculated by finding the ratio between the mass of the extracted analytes and the mass of the analytes in the sample.

For TFME and the SPME, which are based on equilibrium, different characteristics such as surface area and analyte-sorbent interaction can influence analyte recovery rates. To ensure a thorough comparison of these two methods, the absolute recovery (AR) values were measured. The results of these measurements are provided in the table below.

TABLE 8

| Analytes | Absolute Recovery (%) | |
|---|---|---|
| | DVB/PDMS-TFME | DVB/PDMS-SPME |
| α-pinene | 25.4 | 8.2 |
| β-pinene | 27.2 | 8.3 |
| Limonene | 76.3 | 11.8 |
| Benzaldehyde | 89.3 | 6.7 |
| γ-terpinene | 75.2 | 15.4 |
| Linalool | 68.8 | 13.1 |
| Citronellol | 86.8 | 19.6 |
| Geraniol | 89.5 | 25.9 |
| Cinnamaldehyde | 85.6 | 19.3 |
| Thymol | 87.9 | 25.9 |
| Indole | 87.4 | 26.6 |
| Eugenol | 84.4 | 19.9 |
| Isoeugenol | 88.3 | 14.5 |
| Benzyl benzoate | 79.5 | 10 |
| Benzyl salicylate | 33.2 | 3.4 |

Since TFME and SPME use sorbents with similar chemical structures, thus producing similar interactions with fragrances, the higher absolute recovery values recorded for TFME can be attributed to the higher surface area of thin-films compared to SPME.

Method validation. The three developed methods were validated by finding the linear dynamic ranges using the extraction signals at different concentrations and monitoring the signal until linearity was lost. The limits of detection (LODs) and limits of quantification (LOQs) were also studied based on signal-to-noise ratios of 3 and 10, respectively. The repeatability of the proposed methods was tested by performing extractions of analytes several times on different days to calculate the inter- and intra-day relative standard deviations (RSD). In the case of device-to-device RSD, 4 thin-films, 3 SPME, and 4 needles were prepared separately, and their standard deviations for extractions from similar samples was calculated.

The method validation results for limit of detection, limits of quantification and linear dynamic range (in μg L$^{-1}$) of fragrances obtained with Filter/DVB-NTD ("NTD"), DVB/PDMS-TFME ("TFME") and DVB-PDMS-SPME ("SPME") are presented below.

TABLE 9

| | NTD | | TFME | | SPME | | NTD and TFME | SPME |
|---|---|---|---|---|---|---|---|---|
| | | | | | μg L$^{-1}$ | | | |
| Analytes | LOD | LOQ | LOD | LOQ | LOD | LOQ | Linear range | |
| α-pinene | 0.2 | 0.7 | 0.8 | 2.7 | 1.2 | 4 | 2-980 | 4-980 |
| β-pinene | 0.8 | 2.7 | 2.9 | 9.7 | 4.8 | 16 | 10-993 | 17-993 |

TABLE 9-continued

| | NTD | | TFME | | SPME | | NTD and TFME | SPME |
| --- | --- | --- | --- | --- | --- | --- | --- | --- |
| | | | | | µg L⁻¹ | | | |
| Analytes | LOD | LOQ | LOD | LOQ | LOD | LOQ | Linear range | |
| Limonene | 0.9 | 3 | 1.2 | 4 | 3.8 | 12.7 | 4-950 | 13-950 |
| Benzaldehyde | 1.3 | 4.3 | 1.5 | 5 | 9.7 | 32.3 | 5-1021 | 33-1021 |
| γ-terpinene | 0.7 | 2.3 | 0.9 | 3 | 2.3 | 7.7 | 3-978 | 8-978 |
| Linalool | 0.9 | 3 | 1.3 | 4.3 | 3.4 | 11.3 | 4-899 | 12-899 |
| Citronellol | 1.7 | 5.7 | 2 | 6.7 | 4.3 | 14.3 | 7-903 | 19-903 |
| Geraniol | 2.7 | 9 | 3 | 10 | 5.2 | 17.3 | 7-1005 | 15-1005 |
| Cinnamaldehyde | 1.6 | 5.3 | 1.9 | 6.3 | 4.1 | 13.7 | 10-993 | 18-993 |
| Thymol | 0.7 | 2.3 | 0.8 | 2.7 | 1.4 | 4.7 | 6-899 | 14-899 |
| Indole | 0.8 | 2.7 | 0.9 | 3 | 1.5 | 5 | 2-1025 | 5-1025 |
| Eugenol | 1.4 | 4.7 | 1.7 | 5.7 | 3.5 | 11.7 | 3-928 | 5-928 |
| Isoeugenol | 1.7 | 5.7 | 1.9 | 6.3 | 5.9 | 19.7 | 5-893 | 12-893 |
| Benzyl benzoate | 2.1 | 7 | 2.6 | 8.7 | 10.5 | 35 | 7-893 | 20-893 |
| Benzyl salicylate | 2.8 | 9.3 | 8.4 | 28 | 16.7 | 55.7 | 8-901 | 34-901 |

As can be seen, TFME and the NTD provided similar limits of detection and quantifications, and the NTD did provide lower LODs in some cases. In contrast, SPME had higher LODs and LOQs for almost all of the analytes. These disparate results could be explained by these methods' differing extraction mechanisms: NTD is an exhaustive method that can extract all of the analytes from a sample provided the BTV is not reached, while TFME and SPME are equilibrium-based methods with different absolute recovery values. These recovery values are mainly dependent on surface area and the strength of the interaction between the sorbent and analyte. In this case, since the chemical composition of the sorbent—and thus its interaction with the analytes—in both methods was similar, the higher absolute recoveries observed for TFME were undoubtedly due to its greater surface area. Nonetheless, it can be concluded that NTD with full recovery generally provides superior LODs and LOQs.

To find the calibration range, the concentration of analytes was increased until the signal lost its linearity. The tested methods' linear ranges for fragrances is shown above. As the data suggests, the three methods all had similar upper limits, but TFME and NTD provided a wider range due to their lower LOQs.

Method precision. To study the repeatability and reproducibility of the developed methods, inter- and intra-day RSD percentages were measured via repeated extraction/desorption from the sample. For device-to-device RSD measurements, different extraction setups were prepared to study how variations in batch preparation influence the resultant signals. The results of these experiments show that, in general, all three methods provide appropriate repeatability, with inter-day RSD values for NTD ranging from 1.4% to 7.3% and intra-day RSD values for NTD ranging from 1.7% to 5.2%. Additionally, the device-to-device RSD values for the various extraction setups were generally higher than the inter- and intra-day RSDs, which was expected given that the thin-films and needles had been prepared in the lab.

Analysis of home-made and commercial sprays. For the analysis of home-made and commercial sprays, a 100 L plexiglass box was prepared to simulate the conditions of a standard room. Several holes were drilled into the wall of the box at a height corresponding to a "breathing zone." These holes were used for sampling in a similar manner to the hole on the glass sampling bulb. The box also featured a fan and several holes for ventilation, and sampling was conducted with fan both on and off to examine its effect on the concentration of fragrances over time.

To assure the method's applicability for analyzing commercial sprays, a home-made air freshener was prepared based on the instructions provided by Lyndel Dickerson, Donald Cashman, and John A. Ferguson in EP 0419850A1.

Three fragrances (α-pinene, linalool, and benzyl benzoate) were selected based on their various Henry constants and mixed with diethylene glycol monoethyl ether (DEGMEE), isopropyl alcohol, and water in a spray bottle. This home-made air freshener was then sprayed into the sampling box (with the fan turned off) and extractions were performed 15 minutes later. To avoid cross-contamination, the inside of the box was covered with aluminium foil, which was changed after each experiment. In addition, the door of the box was left open under a lab fume hood, and the fan was turned on for 5 minutes between samplings to remove gas and particles from previous samples.

Seven different air fresheners and body sprays were applied as real samples to determine the concentration of fragrances in the gas phase and droplets bound in the breathing zone of the box following their application. The fragrance aerosols were sprayed 3 times for each sampling run, and the concentrations of the fragrances were measured using the three methods (NTD, TFME, SPME). Sampling was performed immediately after administration and at 15, 30, and 60 mins after application.

The home-made air freshener was sprayed inside the 100 L plexiglass box and extracted 15 min after administration using the NTD and TFME. The concentrations of the three targeted fragrance compounds (α-pinene, linalool, and benzyl benzoate) are shown below:

TABLE 10

| | α-pinene (µg L⁻¹) | linalool (µg L⁻¹) | benzyl benzoate (µg L⁻¹) |
| --- | --- | --- | --- |
| NTD | 419 (±10) | 386 (±15) | 263 (±9) |
| TFME | 383 (±6) | 212 (±10) | 77 (±10) |

As can be seen, α-pinene, which is the most volatile compound with the highest Henry constant, is predominantly present in gas free phase; this is mirrored in the results for the NTD and TFME. However, the data for benzyl benzoate reveals a significant difference between TFME and the NTD. This difference can be attributed to benzyl benzoate's lower Henry constant, which prevents it from evaporating in the gas phase and largely confines it to the droplets. While it is possible to trap and study these droplet-bound compounds with the NTD, their data is missing in TFME. The results for linalool fell between those of the other two compounds, which possessed extreme properties. In addition, since a smaller percentage of linalool molecules remained inside of the droplets, the difference between TFME and NTD was also smaller.

To test the developed methods' applicability for determining fragrances in spray samples, a 100 L plexiglass box simulating the conditions of a real room was designed, and the concentration of fragrances was monitored over a "breathing zone" over time in both a "fan on" and "fan off" condition. To monitor concentration over time, an extraction time of 3 minutes was chosen. In all 7 sprays, compounds of interest were detected and determined. In addition, many other compounds were detected and identified via GC-MS. A complete list of these compounds is shown below:

TABLE 11

| Retention Time (min) | Compound |
|---|---|
| *Spray #1* | |
| 3.55 | Butyric acid, 2-methyl-, ethyl ester |
| 3.83 | Isopentyl alcohol, acetate |
| 5.2 | β-pinene |
| 5.356 | n-Hexyl acetate |
| 5.671 | Limonene |
| 5.808 | oxybis Propanol |
| 5.968 | diethyl ester Malonic acid |
| 6.099 | 2,6-Dimethyl-7-octen-2-ol |
| 6.374 | Linalool |
| 6.568 | Benzene ethanol |
| 6.905 | β-Terpineol |
| 6.997 | benzyl ester Acetic acid |
| 7.094 | Heptanoic acid, 2-propenyl ester |
| 7.202 | Benzyl alcohol, alpha-methyl-, acetate |
| 7.317 | a-Terpineol |
| 7.345 | t-Terpineol |
| 7.5 | Citronellol |
| 7.66 | Linalyl anthranilate |
| 8.025 | Vertenex |
| 8.523 | Geraniol acetate |
| 8.877 | Indane-1,3-diolmonoacetate |
| 9.083 | Cyclamal |
| 9.191 | β-Ionone |
| 9.283 | Geraniol butyrate |
| 9.368 | 2-phenoxyethyl isobutyrate |
| 9.437 | Indane-1,3-diolmonopropionate |
| 9.494 | Lilyal |
| 9.746 | d-Undecalactone |
| 10.249 | Methyl dihydrojasmonate |
| 10.283 | a-pentyl Cinnamaldehyde |
| 10.534 | Hexyl salicylate |
| 11.129 | a-hexyl Cinnamaldehyde |
| 11.815 | Isopropyl myristate |
| 12.272 | Galoxolide |
| 12.352 | Musk 36A |
| 15.004 | Astratone |
| *Spray #2* | |
| 5.105 | Myrcene |
| 5.638 | Limonene |
| 5.694 | 3,3'-oxybis-2-butanol |
| 5.742 | oxybis Propanol |
| 6.053 | Dihydro myrcenol |
| 6.357 | Linalool |
| 6.536 | Benzene ethanol |
| 6.968 | benzyl ester Acetic acid |
| 7.477 | Citronellol |
| 7.646 | Linalyl anthranilate |
| 7.998 | Vertenex |
| 8.368 | a-Terpineol acetate |
| 8.39 | Nerol acetate |
| 8.513 | Geraniol acetate |
| 9.154 | a-Cetone |
| 9.184 | β-Ionone |
| 9.276 | β-methyl Ionone |
| 9.389 | a-N-Methyl ionone |
| 9.433 | Indane-1,3-diolmonopropionate |
| 9.474 | Lilyal |
| 9.772 | Salicylic acid, pentyl ester |
| 10.254 | Methyl dihydrojasmonate |
| 10.526 | Hexyl salicylate |
| 11.112 | a-hexyl Cinnamaldehyde |
| 12.259 | Galoxolide |
| 12.664 | Benzyl salicylate |
| 12.986 | Musk 36A |
| *Spray #3* | |
| 5.642 | Limonene |
| 5.962 | γ-Terpinene |
| 6.064 | Dihydromyrcenol |
| 6.368 | Linalool |
| 6.983 | Acetic acid, benzyl ester |
| 7.243 | Ethyl linalool |
| 8.176 | Dimethylphenethyl acetate |
| 8.816 | 1-hexen-4-ol,3-methyl-5-phenyl |
| 9.193 | β-Ionone |
| 9.24 | 2,5-Diisopropyl-p-xylene |
| 9.339 | (3-Methyl-4-pentenyl) benzene |
| 9.744 | Dihydrosafrol |
| 9.947 | Eugenol acetate |
| 10.233 | Triethyl citrate |
| 10.268 | Methyl dihydrojasmonate |
| 11.127 | a-hexyl Cinnamaldehyde |
| 11.479 | Benzyl benzoate |
| 12.286 | Galoxolide |
| 12.678 | Benzyl salicylate |
| 12.352 | Musk 36A |
| 15.991 | Mono(2-ethylhexyl) phthalate |
| *Spray #4* | |
| 5.567 | 3,3'-oxybis-2-butanol |
| 5.784 | Oxybis Propanol |
| 6.342 | Linalool |
| 7.221 | Ethyl linalool |
| 7.285 | p-menth-1-ene-8-ol |
| 7.846 | p-Menthan-7-ol, trans- |
| 7.909 | p-Menthan-7-ol, cis- |
| 9.004 | Thujopsen |
| 9.153 | a-Cetone |
| 9.182 | β-Ionone |
| 9.274 | 3,5-Diisopropenyl-1,1,2-trimethylcyclohexane |
| 9.476 | Lilyal |
| 10.251 | Methyl dihydrojasmonate |
| 10.462 | 2-(4a,8-Dimethyl-6-oxo-1,2,3,4,4a,5,6,8a-octahydro-naphthalen |
| 11.04 | Dihydro myrcenol |
| 11.399 | Benzyl benzoate |
| 12.179 | 2-Hydroxycyclopentadecanone |
| 12.262 | Galoxolide |
| 12.658 | Benzyl salicylate |
| 13.147 | Musk 36A |
| 14.987 | Musk T |
| *Spray #5* | |
| 4.645 | β-pinene |
| 4.956 | n-Hexyl acetate |
| 5.278 | Limonene |
| 5.509 | oxybis Propanol |
| 5.608 | g-Terpinene |
| 6.082 | Linalool |
| 6.612 | Ethyl acetoacetate ethylene ketal |
| 6.724 | Benzyl acetate |
| 6.958 | Gardenol |
| 7.037 | n-Dodecane |
| 7.29 | Citronellol |
| 7.472 | Linalyl anthranilate |
| 7.727 | Cinnamaldehyde |
| 7.881 | Indole |

TABLE 11-continued

| Retention Time (min) | Compound |
|---|---|
| 8.665 | Anisyl acetate |
| 8.72 | Ananolide |
| 8.756 | cis-Ethyl 3-methyl-3-phenylglycidate |
| 8.874 | Isoeugenol |
| 8.973 | Cyclamal |
| 9.031 | 2,5-Diisopropyl-p-xylene |
| 9.147 | a-Cetone |
| 9.26 | a-N-Methyl ionone |
| 9.357 | Lilyal |
| 10.112 | Methyl dihydrojasmonate |
| 10.357 | Hexyl salicylate |
| 11.184 | Benzyl benzoate |
| 12.013 | Galoxolide |
| 12.393 | Benzyl salicylate |
| 12.69 | Musk 36A |
| 13.495 | Hexadecanoic acid |
| Spray #6 | |
| 5.655 | Limonene |
| 6.077 | Dihydromyrcenol |
| 6.38 | Linalool |
| 7.45 | 1-Methyldodecyl butyrate |
| 7.498 | Citronellol |
| 7.685 | Guaniol |
| 7.974 | Citronellal hydrate |
| 8.875 | Indan-1,3-diol monoacetate |
| 9.09 | Cyclamal |
| 9.786 | Pentyl salicylate |
| 10.24 | Triethyl citrate |
| 10.27 | Methyl dihydrojasmonate |
| 10.481 | Methyl jasmonate |
| 11.131 | Cinnamaldehyde, alpha-hexyl- |
| 11.823 | Bisomel |
| 12.282 | Musk 36A |
| 12.681 | Benzyl salicylate |
| 15.014 | Musk T |
| Spray #7 | |
| 5.74 | oxybis-Propanol, |
| 6.356 | Linalool |
| 7.119 | Ethyl linalool |
| 7.288 | Ethyl maltol |
| 7.648 | Bergamot mint oil |
| 8 | Vertenex |
| 9.738 | Allyl 2-methoxybenzoate |
| 10.251 | Methyl dihydrojasmonate |
| 11.197 | n-Octyl benzoate |
| 11.801 | Bisomel |
| 12.047 | Linoleic acid |
| 12.499 | Undecyl benzoate |
| 15.866 | Musk T |

The concentrations of the analytes were determined over a 1 h period. The results are shown below:

TABLE 12

| | Method | | | | | | | | | | | |
|---|---|---|---|---|---|---|---|---|---|---|---|---|
| | NTD | | | | TFME | | | | SPME | | | |
| | Post-application time (min) | | | | | | | | | | | |
| | 0 | 15 | 30 | 60 | 0 | 15 | 30 | 60 | 0 | 15 | 30 | 60 |
| Spray #1 (Fan turned off) | | | | | | | | | | | | |
| β-pinene | 48 (±1) | 31 (±1) | 10 (±0) | ND | 39 (±2) | 27 (±2) | Below LOQ | ND | 42 (±3) | 22 (±1) | ND | ND |
| Limonene | 149 (±9) | 83 (±3) | 41 (±2) | 21 (±1) | 148 (±4) | 78 (±5) | 32 (±2) | 14 (±1) | 153 (±6) | 77 (±5) | 42 (±2) | ND |
| Linalool | 361 (±14) | 114 (±5) | 59 (±2) | 33 (±2) | 98 (±6) | 56 (±4) | 30 (±2) | ND | 89 (±8) | 69 (±7) | 27 (±1) | ND |
| Citronellol | 519 (±42) | 371 (±26) | 167 (±5) | 77 (±3) | 201 (±12) | 94 (±7) | 67 (±3) | 21 (±1) | 197 (±4) | 96 (±4) | 73 (±5) | 19 (±1) |
| Spray #1 (Fan turned on) | | | | | | | | | | | | |
| β-pinene | 31 (±1) | ND | ND | ND | 28 (±1) | ND | ND | ND | 21 (±1) | ND | ND | ND |
| Limonene | 110 (±6) | 57 (±5) | 23 (±1) | ND | 105 (±7) | 63 (±3) | ND | ND | 107 (±4) | 78 (±5) | ND | ND |
| Linalool | 278 (±19) | 95 (±5) | 31 (±2) | ND | 74 (±4) | 36 (±3) | ND | ND | 79 (±2) | 41 (±2) | ND | ND |
| Citronellol | 289 (±14) | 105 (±6) | 21 (±1) | ND | 106 (±7) | 46 (±4) | ND | ND | 98 (±6) | 38 (±2) | ND | ND |
| Spray #2 (Fan turned off) | | | | | | | | | | | | |
| Limonene | 68 (±3) | 45 (±2) | 17 (±1) | 8 (±1) | 59 (±2) | 38 (±2) | 12 (±0) | 7 (±1) | 61 (±1) | 40 (±2) | 14 (±0) | ND |
| Benzyl salicylate | 123 (±10) | 68 (±4) | 22 (±1) | ND | 41 (±2) | ND | ND | ND | ND | ND | ND | ND |
| Citronellol | 682 (±41) | 378 (±15) | 107 (±6) | 48 (±3) | 271 (±19) | 115 (±7) | 96 (±5) | 52 (±3) | 269 (±16) | 121 (±8) | 89 (±4) | 48 (±2) |
| Spray #2 (Fan turned on) | | | | | | | | | | | | |
| Limonene | 59 (±4) | 17 (±1) | ND | ND | 49 (±2) | 20 (±1) | ND | ND | 51 (±2) | 18 (±1) | ND | ND |
| Benzyl salicylate | 103 (±106) | 31 (±10) | ND | ND | 30 (±2) | ND | ND | ND | 28 (±1) | ND | ND | ND |
| Citronellol | 618 (±25) | 204 (±12) | 68 (±5) | ND | 199 (±10) | 78 (±61) | ND | ND | 206 (±12) | 83 (±69) | ND | ND |
| Spray #3 (Fan turned off) | | | | | | | | | | | | |

TABLE 12-continued

| | Method | | | | | | | | | | | |
|---|---|---|---|---|---|---|---|---|---|---|---|---|
| | NTD | | | | TFME | | | | SPME | | | |
| | Post-application time (min) | | | | | | | | | | | |
| | 0 | 15 | 30 | 60 | 0 | 15 | 30 | 60 | 0 | 15 | 30 | 60 |
| Limonene | 194 (±14) | 106 (±5) | 21 (±1) | ND | 178 (±5) | 98 (±5) | 24 (±1) | ND | 181 (±13) | 96 (±5) | 21 (±1) | ND |
| γ-terpinene | 451 (±14) | 314 (±16) | 193 (±6) | 69 (±4) | 392 (±12) | 296 (±12) | 164 (±10) | 71 (±5) | 389 (±27) | 278 (±19) | 171 (±7) | 63 (±4) |
| Linalool | 41 (±1) | 15 (±1) | ND | ND | 28 (±1) | 9 (±1) | ND | ND | 31 (±1) | Below LOQ | ND | ND |
| Benzyl benzoate | 841 (±25) | 603 (±30) | 107 (±2) | 56 (±3) | 481 (±29) | 253 (±18) | 88 (±4) | 39 (±3) | 490 (±29) | 261 (±21) | 96 (±4) | 48 (±4) |
| Benzyl salicylate | 78 (±4) | 41 (±2) | ND | ND | 45 (±2) | 17 (±1) | ND | ND | 59 (±2) | ND | ND | ND |
| Spray #3 (Fan turned on) | | | | | | | | | | | | |
| Limonene | 142 (±6) | 94 (±4) | ND | ND | 106 (±5) | 74 (±4) | ND | ND | 111 (±3) | 79 (±3) | ND | ND |
| γ-terpinene | 391 (±8) | 106 (±4) | Below LOQ | ND | 279 (±8) | 96 (±6) | ND | ND | 287 (±9) | 79 (±4) | ND | ND |
| Linalool | 18 (±1) | ND | ND | ND | 13 (±2) | ND | ND | ND | 11 (±0) | ND | ND | ND |
| Benzyl benzoate | 683 (±34) | 198 (±6) | 69 (±3) | ND | 301 (±6) | 96 (±3) | 41 (±2) | ND | 298 (±6) | 101 (±4) | 48 (±2) | ND |
| Benzyl salicylate | 59 (±3) | ND | ND | ND | 33 (±2) | ND | ND | ND | ND | ND | ND | ND |
| Spray #4 (Fan turned off) | | | | | | | | | | | | |
| Linalool | 367 (±18) | 108 (±6) | 43 (±2) | 9 (±0) | 198 (±6) | 58 (±3) | 6 (±0) | ND | 201 (±4) | 64 (±3) | 9 (±1) | ND |
| Benzyl benzoate | 205 (±8) | 79 (±5) | 52 (±3) | ND | 96 (±4) | 43 (±3) | ND | ND | 98 (±4) | 51 (±3) | ND | ND |
| Benzyl salicylate | 99 (±5) | 48 (±4) | 13 (±1) | ND | 51 (±2) | ND | ND | ND | 59 (±2) | Below LOQ | ND | ND |
| Spray #4 (Fan turned on) | | | | | | | | | | | | |
| Linalool | 161 (±5) | 68 (±3) | ND | ND | 106 (±6) | 41 (±3) | ND | ND | 99 (±4) | 49 (±4) | ND | ND |
| Benzyl benzoate | 169 (±7) | 41 (±2) | ND | ND | 79 (±2) | 21 (±1) | ND | ND | 83 (±4) | 26 (±2) | ND | ND |
| Benzyl salicylate | 65 (±3) | 17 (±1) | ND | ND | 38 (±2) | ND | ND | ND | ND | ND | ND | ND |
| Spray #5 (Fan turned off) | | | | | | | | | | | | |
| β-pinene | 51 (±1) | 16 (±1) | ND | ND | 47 (±1) | 13 (±0) | ND | ND | 49 (±1) | 12 (±1) | ND | ND |
| Limonene | 78 (±2) | 35 (±1) | 12 (±1) | ND | 66 (±3) | 28 (±1) | 11 (±1) | ND | 71 (±5) | 33 (±2) | ND | ND |
| Linalool | 268 (±8) | 114 (±6) | 67 (±4) | 34 (±2) | 105 (±5) | 74 (±3) | 25 (±2) | ND | 98 (±4) | 68 (±3) | 31 (±2) | ND |
| Cinnamaldehyde | 104 (±5) | 61 (±2) | ND | ND | 57 (±3) | 25 (±1) | ND | ND | 61 (±4) | 32 (±2) | ND | ND |
| Indole | 86 (±3) | 47 (±2) | 15 (±1) | ND | 38 (±3) | 16 (±0) | ND | ND | 42 (±2) | 21 (±1) | ND | ND |
| Isoeugenol | 194 (±6) | 94 (±6) | 41 (±2) | ND | 67 (±5) | 33 (±2) | 12 (±1) | ND | 72 (±2) | 36 (±2) | Below LOQ | ND |
| Benzyl benzoate | 278 (±22) | 164 (±15) | 71 (±6) | 37 (±3) | 105 (±6) | 74 (±4) | 38 (±2) | Below LOQ | 98 (±8) | 67 (±5) | 41 (±2) | ND |
| Benzyl salicylate | 241 (±17) | 98 (±8) | 66 (±4) | 31 (±2) | 94 (±7) | 57 (±3) | 15 (±2) | ND | 96 (±3) | 64 (±5) | 21 (±1) | ND |
| Spray #5 (Fan turned on) | | | | | | | | | | | | |
| β-pinene | 45 (±1) | Below LOQ | ND | ND | 37 (±1) | ND | ND | ND | 35 (±1) | ND | ND | ND |
| Limonene | 60 (±3) | 26 (±2) | ND | ND | 51 (±3) | 13 (±1) | ND | ND | 47 (±2) | Below LOQ | ND | ND |
| Linalool | 181 (±9) | 96 (±4) | 31 (±2) | ND | 89 (±3) | 31 (±1) | ND | ND | 91 (±5) | 42 (±3) | ND | ND |
| Cinnamaldehyde | 78 (±2) | 31 (±1) | ND | ND | 31 (±1) | Below LOQ | ND | ND | 36 (±2) | ND | ND | ND |
| Indole | 71 (±4) | 33 (±1) | Below LOQ | ND | 21 (±2) | ND | ND | ND | 19 (±1) | ND | ND | ND |
| Isoeugenol | 106 (±8) | 73 (±6) | 21 (±1) | ND | 51 (±5) | 22 (±1) | ND | ND | 54 (±4) | 25 (±2) | ND | ND |
| Benzyl benzoate | 121 (±10) | 83 (±7) | 51 (±3) | ND | 72 (±4) | 33 (±2) | ND | ND | 76 (±4) | 41 (±2) | ND | ND |
| Benzyl | 163 | 67 | 34 | ND | 73 | 31 | ND | ND | 78 | Below | ND | ND |

TABLE 12-continued

| | Method | | | | | | | | | | | |
|---|---|---|---|---|---|---|---|---|---|---|---|---|
| | NTD | | | | TFME | | | | SPME | | | |
| | Post-application time (min) | | | | | | | | | | | |
| | 0 | 15 | 30 | 60 | 0 | 15 | 30 | 60 | 0 | 15 | 30 | 60 |
| salicylate | (±10) | (±5) | (±2) | | (±4) | (±2) | | | (±5) | LOQ | | |
| | Spray #6 (Fan turned off) | | | | | | | | | | | |
| Linalool | 418 (±13) | 261 (±16) | 107 (±6) | 78 (±5) | 174 (±9) | 78 (±5) | ND | ND | 181 (±11) | 82 (±4) | ND | ND |
| Citronellol | 104 (±4) | 51 (±3) | Below LOQ | ND | 67 (±4) | 35 (±1) | ND | ND | 77 (±3) | 29 (±1) | ND | ND |
| Benzyl salicylate | 119 (±7) | 79 (±5) | 51 (±2) | 19 (±1) | 31 (±2) | Below LOQ | ND | ND | Below LOQ | ND | ND | ND |
| | Spray #6 (Fan turned on) | | | | | | | | | | | |
| Linalool | 371 (±22) | 104 (±7) | 31 (±2) | 13 (±1) | 103 (±7) | 23 (±1) | ND | ND | 104 (±7) | 38 (±3) | ND | ND |
| Citronellol | 78 (±2) | 31 (±1) | ND | ND | 56 (±2) | ND | ND | ND | 49 (±2) | ND | ND | ND |
| Benzyl salicylate | 98 (±3) | 42 (±1) | 12 (±1) | ND | 20 (±1) | ND | ND | ND | ND | ND | ND | ND |
| | Spray #7 (Fan turned off) | | | | | | | | | | | |
| Linalool | 451 (±27) | 321 (±13) | 204 (±10) | 100 (±6) | 104 (±5) | 78 (±5) | 31 (±2) | 12 (±0) | 98 (±5) | 79 (±4) | 34 (±1) | Below LOQ |
| | Spray #7 (Fan turned on) | | | | | | | | | | | |
| Linalool | 241 (±12) | 104 (±5) | 41 (±2) | ND | 74 (±3) | 14 (±1) | ND | ND | 69 (±4) | 17 (±1) | ND | ND |

The analysis discussed below associated with the data for b-pinene and benzyl salicylate in Spray 5 can be generally applied to all other samples and analytes. These two compounds were chosen because they served as exemplars of highly volatile and non-volatile fragrance compounds. Based on their vapor pressure, it was expected that b-pinene would generally prefer to be in the gas phase, while benzyl salicylate would largely remain in the droplet phase.

The data reveal some common trends. For instance, the concentrations obtained from TFME and SPME are generally similar considering RSD, as these methods are able to determine the concentration of analytes in vapor phases. As expected, the concentration of fragrances decreases exponentially over time, reaching zero for most of the compounds during the sampling time (1 h). Additionally, the concentration of fragrances is lower in the fan-on condition and diminishes faster over time, which reveals the importance, necessity, and efficiency of ventilators when fragrances are applied indoors.

It was also observed that the results for the NTD and TFME (and SPME) begin to converge as time passes. This finding indicates that analytes largely remain in gas phase for some time after the application of sprays before, which can be due to the settling of particles on the walls of the box, which means the remaining fragrance compounds in the air remain in the gas-phase.

The other important finding of this study is the differences in the concentration obtained using the NTD (total concentration) and other two methods (free, vapor phase concentration). The differences between NTD and TFME (and SPME) were larger for lower-vapor-pressure compounds (benzyl salicylate) that prefer to remain in droplets rather than the gas phase, which was not the case for volatile compounds with larger vapor pressure values (b-pinene). This difference is due to the NTD's ability to trap particles that cannot be captured by TFME and SPME. Droplets from sprays with less-volatile compounds dissolved in them are trapped by the NTD and can be detected in the GC-MS after desorption, whereas TFME and SPME are only able to extract fragrances present free form in the gas phase.

To check if this explanation can be extended to other data in this study, the particle-to-vapor phase concentration ratio of the analytes was calculated by $$\frac{NTD - TFME}{TFME},$$

and the analytes were then categorized as either volatile (VP>1 mmHg) or non-volatile (VP<1 mmHg) compounds. Non-volatile compounds (VP<1 mmHg) had a wide range of particle-to-vapor phase ratios, including numbers as large as 3.9. In contrast, this ratio was compressed around 1 for the volatile compounds (VP>1 mmHg, orange box). This result suggests that, in the case of non-volatile compounds, a large portion of the fragrance compounds remain in the droplet phase, which can be trapped and detected by the NTD (resulting in large particle-to-vapor phase concentration ratio). Conversely, the results for the NTD and TFME for volatile compounds do not cover a wide range, which implies that most of these volatile compounds are in free vapor phase and can be detected by TFME as well as the NTD.

Comparison of passive and active sampling for studying fragrances in the bathroom. The analysis of indoor pollutants is often carried out using passive (time weighted averaging) sampling methods. In these methods, the extraction device is left to sit in the environment for a lengthy known period of time; if the diffusion coefficient of the compound is known, the concentration of the sample can then be calculated using the following equation $$C = \frac{nZ}{DAt} \quad \text{Eq. 2}$$

where C is the analyte concentration (mol cm$^{-3}$), D is the analyte diffusion coefficient (cm$^2$ s$^{-1}$), Z is the length along the diffusion (the distance between the needle tip and the sorbent inside the needle) path in (cm), n is the number of moles in the target analyte (mol), A is the diffusion path cross-sectional area (needle area) (cm$^2$), and t is the duration (s) of the sampling period.

To ensure that Z is accurate, a needle was packed with DVB particles (Z=3 mm) without any filter. For comparison, the DVB-SPME was also applied for passive sampling while the fiber was withdrawn inside the needle. Specifically, both devices were used to perform passive sampling of Spray #7, which had been applied inside of a bathroom. The NTD (without pump) and withdrawn SPME were left inside the bathroom for 1 h. After sampling had been completed, the devices were desorbed and the concentration of linalool in the spray was determined based on D=0.021 mm$^2$ h$^{-1}$ from previous studies.[32]

The devices were then compared for their abilities in active sampling, again using Spray #7. For active sampling with the NTD, the bathroom air was drawn through the needle (packed with a filter and DVB) at a rate of 30 mL min$^{-1}$ for 3 minutes; for active SPME, the fiber was exposed to the air inside the bathroom for 3 minutes and then desorbed. This procedure was repeated at 0, 15, 30, and 60 minutes following the application of the spray.

To compare the devices' abilities for passive and active sampling, Spray #7 was applied inside of a bathroom, and SPME and the NTD were left there to sample for 60 minutes (=1 h). Active sampling was tested using similar conditions. The results of these tests are listed below, which shows concentrations of linalool found in bathroom air after applying Spray #7 using both active and passive NTD and SPME.

TABLE 13

| Method Concentration Post-application time (min) | Active sampling time range (min) μg L$^{-1}$ | | | | Passive sampling time range (min) |
|---|---|---|---|---|---|
| | 0 | 15 | 30 | 60 | 60 |
| NTD | 348 (±4%) | 251 (±7%) | 98 (±9%) | ND | 48 (±5%) |
| SPME | 89 (±2%) | 45 (±11%) | 22 (±14%) | ND | 41 (±4%) |

The values in brackets represents the relative standard deviation percentages. As the data show, the results for both methods were statistically similar when used for passive sampling, likely due to the droplets being unable to reach the NTD nor SPME due to their large size and low diffusion coefficient. It should be noted that the concentrations from passive sampling represent the average concentration over the sampling period. Based on these explanations, in both methods with passive sampling, only free concentration over 1 h sampling time is measured, which is reflected in similar results obtained by both methods.

As previously noted, the difference between the NTD and SPME for active sampling was due to the concentration of linalool inside of the droplets, which can be determined via the NTD, but not SPME. As can be seen, the difference in concentration is quite large, thus demonstrating the necessity of using an NTD equipped with a filter when analyzing aerosol samples.

These results clearly demonstrate the superiority of the exemplary filter-incorporated NTD. When compared to SPME and TFME in active sampling mode, the significant concentration of compounds inside the droplets captured by the filter-incorporated NTD is the key factor highlighting its exceptional performance in fragrance analysis. Indeed, while TFME and SPME are only able to capture the free concentration of analytes, the NTD is able to also capture the analytes trapped within the droplets, thus providing the total concentration of analytes.

Furthermore, unlike other passive sampling methods, which can only reveal the average concentration over a time span, the exemplary filter-incorporated NTD can determine the total concentration at different times. This is significant, as the ability to monitor the total concentration over time enables us to find the peak concentration after the administration of fragrance containing products. This property is particularly important when considering allergens. For example, while the average and free concentrations of these compounds over time may be lower than the limits set forth by regulatory administrations, they may exceed these limits when their total concentration is considered.

Detecting Free Versus Droplet-Bound Aroma Compounds in Sparkling Beverages

One of the major innovations in the drink industry has been the introduction of carbonated drinks. It is believed that effervescence is responsible for the enhanced flavor and sense of refreshment that are characteristic to carbonated drinks. While studies have examined how carbonation influences consumers' perceptions of taste and flavor, considerably less attention has been devoted to the influence of carbonation and sparkling droplets upon entering the consumer's nasal cavity.

In the experiments discussed below, odorants in commercial sparkling beverages were quantified immediately after opening the bottle to mimic real-life conditions of the consumer's experience of flavor. The odorants were quantified by first trapping droplet-bound odorants using an exemplary flow-through aerosol capture device according to the present disclosure, and by comparing the device against a poly dimethyl siloxane (PDMS) coated thin-film used for extraction of gas phase aroma. Following trapping/extraction, the devices were desorbed and separated using GC-MS.

The main goal of the experiments discussed below is to examine the active odor components in sparkling beverages, both in the gas phase and particle-bound. To this end, polydimethylsiloxane thin-film microextraction (PDMS-TFME) was applied to perform extractions from the gas phase, and a flow-through aerosol capture device according to the present disclosure was employed to trap the droplets. Sampling was conducted without the removal of bubbles or the addition of salt in order to preserve actual consumer conditions. Furthermore, sampling was performed for 3 minutes immediately after opening the bottle, which was sufficient to enable the detection and trapping of droplets before effervescence was completely lost. The results of this research can provide a more accurate understanding of the consumer's experience of flavored beverages in daily life.

Materials and Instrumentation. Analytical grade furfural, methional, α-pinene, ethyl caproate, limonene, γ-terpinene, linalool, and citronellol were all purchased from Sigma-Aldrich (Mississauga, ON, Canada). Lime and orange flavored soda, orange flavored natural carbonated spring water, two lime and lemon-flavored sparkling spring water, and wheat and non-alcoholic beer were purchased from local market for analysis.

Instruments and conditions were the same as those discussed above, though the GC oven temperature programming for separation of the aroma compounds is shown below:

TABLE 14

| Rate (° C. min$^{-1}$) | Temperature (° C.) | Hold Time (min) |
|---|---|---|
|  | 40 | 0 |
| 20 | 80 | 0 |
| 8 | 100 | 0 |
| 20 | 150 | 0 |
| 25 | 200 | 5 |
| 8 | 220 | 0 |

The PDMS-TFME and H-PAN based aerosol capture device were prepared as discussed above. For the thin-film devices, a carbon-mesh was coated with a layer of PDMS according to the procedure disclosed in Anal. Chem. 2016, 88, 3, 1760-1767. Briefly, 4.54 g of Sylgard 186 PDMS base and 3.8 g of hexane were mixed inside a syringe, followed by the addition of 0.46 g of Sylgard 186 cross-linking agent. Finally, the mixture was spread over a 25 cm×60 cm carbon-mesh sheet using an Elcometer 4340 motorized film applicator. Once coated, the carbon-mesh sheet was left to dry at 90° C. at a gauge pressure of −15 mmHg under nitrogen purge for at least half an hour. The coated thin films were then cut into the desired sizes (30×4 mm) and conditioned before extraction.

Preparation of the H-PAN aerogel was performed as discussed above. The aerosol capture device used was a TDU liner, as illustrated in FIG. 4. The aerosol capture device used in these experiments did not include any sorbent particles with the H-PAN aerogel.

All experiments were performed in gas phase. For PDMS-TFME calibration, a 1-L glass bulb was initially washed, dried, vacuumed, and injected with 1 μL of pure analytes, which were subsequently evaporated via heating. The final concentration of the stock gas mixture was determined to be between 200 and 300 ppm, depending on the analyte. The stock gas mixture was then diluted in another glass bulb using gas-tight syringes in order to attain the required concentrations of the compounds. The concentration range for calibration of the method using PDMS-TFME is shown below:

TABLE 15

| Analyte | Calibration concentration range in sampling bulb (μg L$^{-1}$) | |
|---|---|---|
| Furfural | 0.4 | 575 |
| Methional | 0.3 | 515 |
| a-pinene | 0.2 | 429 |
| Ethyl caproate | 0.4 | 433.5 |
| Limonene | 0.1 | 421 |
| γ-terpinene | 0.3 | 420.5 |
| Linalool | 0.1 | 432.5 |
| Citronellol | 0.1 | 427.5 |

Another calibration curve (523-2143 μg L$^{-1}$) was also drawn for limonene to cover the abundant amounts of it found in some samples.

The concentration of droplet-bound components trapped by the H-PAN filter was calibrated based on the assumption that trapping was exhaustive due to the small sample volume, and that the breakthrough volume had not been reached. To this end, extracted amounts were calculated using a liquid-injection calibration curve (10-1000 ng). The extracted amount (in ng) was divided by the sampling volume (15 mL) to find the concentrations of the compounds in the gas sample.

Extraction procedure. Since the main goal of these experiments was to compare free and droplet-bound concentrations of aroma compounds in sparkling beverages, conventional optimization procedures for improving sensitivity were not performed. Extraction conditions (time and temperature) were selected to mimic the real consumer experience of initial exposure to beverage flavor. As a result, a short extraction time at room temperature was selected. In addition, the short extraction time ensured that the low amounts of water in the H-PAN filter did not cause any problems for the GC instrument.

For the extractions with PDMS-TFME, a pre-equilibrium condition with an extraction time of 3 minutes was chosen. The thin-films were calibrated by exposing them to the gas sample mixture for 3 minutes in a glass bulb, and then transferring them to the TDU liner for desorption.

For H-PAN filter calibration, the concentration of the trapped aroma compounds was calculated by dividing the trapped amount (using liquid injection calibration curve) by the sampling volume (15 mL).

Extraction/trapping was performed immediately after opening the beverage or standard mixture. In cases where the bottle or can did not have enough headspace for sampling, the beverage was transferred to another sampling bottle that provided appropriate extraction conditions. For PDMS-TFME extraction, the thin-films were exposed to the sample headspace for 3 minutes and then transferred for desorption. Droplet trapping via the H-PAN filter involved exposing the packed liner to the sample and drawing the headspace into the liner using a syringe pump (flow rate=5 mL min$^{-1}$, volume=15 mL).

After sampling, the TDU liner was transferred to the GC-MS instrument for desorption.

Preliminary studies in standard mixtures. Preliminary studies were conducted to assess the extraction efficiency of PDMS-TFME and the trapping capability of the H-PAN filter in carbonated and non-carbonated samples. To this end, a standard mixture of the analytes was prepared in water (400 μg L$^{-1}$, 500 mL), with extraction and trapping being performed according to the procedures discussed above. The same process was repeated for similar mixtures, while the final mixture was carbonated using a Soda Stream machine.

Comparison of carbonated and non-carbonated mixtures. The results from the chromatographs (not shown) indicated that sampling the non-carbonated standard mixture with the H-PAN filter produced peaks with very low intensity. Some polar compounds (e.g., furfural and methional with log P=0.3-0.4) were not detected by the H-PAN filter, while others non-polar compounds that were detected (e.g., limonene and linalool) had peak-area ratios that were less than 2% of those acquired with PDMS-TFME, thus indicating that the H-PAN filter had very low extraction efficiency for gas phase components. In detail, furfural, methional, α-pinene and citronellol were not detected, while ethyl caproate, limonene, γ-terpinene and linalool had reported concentration ratios 2.1, 0.5, 0.6, 0.6% (vs. PDMS-TFME), respectively. Given the H-PAN filter's low extraction efficiency for gas-phase components, it can be assumed that the obtained results from H-PAN filter are connected to the trapping of the droplets, not from the gas-phase extractions.

A comparison of the concentrations of odorants extracted from the carbonated and non-carbonated samples with the H-PAN filter (shown in the table below, data reported in μg/L) revealed that, with respect to the carbonated sample, the filter was capable of capturing and therefore facilitate quantifying polar compounds with high tendencies to remain in aqueous phase (i.e., furfural and methional with log P=0.3-0.4). This result was due to the H-PAN filter's ability to trap droplets after carbonation, which was not observed in the non-carbonated sample (without droplets).

To ensure that the PDMS-TFME device only extracted analytes from the gas phase, the extractions were performed using carbonated and non-carbonated components. Generally, the PDMS-TFME device extracted similar amounts of analytes from the carbonated and non-carbonated mixtures (as illustrated in the table below), meaning that the presence/absence of droplets does not play a significant role in extractions with the TFME device. It can therefore be concluded that the PDMS-TFME extractions occurred in the gas phase, and that the slight increase in analytes extracted from the carbonated samples can be attributed to the increased evaporation rate of analytes during bubbling. If this increment was the result of droplet attachment to the PDMS-TFME surface, furfural and methional should have been detected and identified.

TABLE 16

|  | Non-carbonated PDMS-TFME | Carbonated PDMS-TFME | Non-carbonated H-PAN filter | Carbonated H-PAN filter |
| --- | --- | --- | --- | --- |
| furfural | 0 | 0 | 0 | 6.51 |
| methional | 0 | 0 | 0 | 12.56 |
| α-pinene | 3.57 | 4.05 | 0 | 1.55 |
| ethyl caproate | 7.85 | 10.73 | 0.17 | 11.36 |
| limonene | 63.6 | 69.03 | 0.29 | 21.85 |
| γ-terpinene | 71.35 | 76.57 | 0.41 | 21.12 |
| linalool | 2.22 | 2.02 | 0.02 | 1.48 |
| citronellol | 10.97 | 10.71 | 0 | 1.55 |

Analysis of sparkling beverages. To test the ability of the NTD to analyze sparkling beverages, different types of drinks were studied, including soda and sparkling water with different flavors.

As shown in the table below, different compounds, including limonene, γ-terpinene, linalool, citronellol, and ethyl caproate, were detected and quantified in the drink samples. The table shows Concentration of active aroma compounds in different sparkling beverages determined using PDMS-TFME and H-PAN filter (in μg L$^{-1}$). The presence of these compounds is not surprising, as they are the components of lemon oil, lime oil, and orange oil that are commonly added to beverages to introduce the required flavors.

TABLE 17

| Sparking Beverages | PDMS-TFME | H-PAN Filter |
| --- | --- | --- |
| Lime-Soda | | |
| Limonene | 71.73 (±14%) | 11.95 (±7%) |
| γ-terpinene | 4.19 (±15%) | 0.52 (±10%) |
| Sparkling water-Lime | | |
| Limonene | 12.54 (±18%) | 1.28 (±16%) |
| γ-terpinene | 2.37 (±13%) | 0.26 (±8%) |
| Linalool | 0.44 (±7%) | 0.12 (±83%) |
| Citronellol | 1.89 (±19%) | 0.13 (±9%) |
| Sparkling water-Lemon | | |
| Limonene | 144.27 (±13%) | 52.18 (±11%) |
| γ-terpinene | 10.84 (±18%) | 2.86 (±15%) |
| Orange-Soda | | |
| Limonene | 1665.5 (±11%) | 2017.13 (±6%) |
| Non-alcoholic beer | | |
| Ethyl caproate | 24.83 (±8%) | 12.34 (±0.2%) |
| Limonene | 3.61 (±6%) | 6.77 (±6%) |
| spring carbonated water-orange | | |
| Limonene | 823.3 (±3%) | 23.97 (±9%) |
| γ-terpinene | 21.61 (±4%) | 0.61 (±12%) |
| Linalool | 7.64 (±7%) | 0.11 (±8%) |
| Wheat Beer | | |
| Ethyl caproate | 3.72 (±5%) | 2.11 (±3%) |
| Citronellol | 13.64 (±5%) | 0.66 (±3%) |

The concentration of these components varied depending on the type of the drink. Chromatograms were obtained after using the H-PAN filter and PDMS-TFME to trap/extract odorants from lime-flavored sparkling spring water and orange-flavored natural carbonated spring water. As different approaches were used to calibrate each method, their detected concentrations could not be compared using the absolute intensities of the peak areas in the chromatograms. It is worth noting that the odorant concentrations reported herein were detected in the gas phase or droplet-bound portion of the sample headspace; therefore, they cannot be considered as representative of the concentrations of odorants in the liquid phase of the beverage.

It is also important to note that the droplet-bound odorant concentrations reported in the table above were dependent on different factors, principally physiochemical factors and carbonation type. For physiochemical aspect, the analysis of the standard mixture revealed that polarity also plays an important role, as compounds with higher polarity prefer to remain inside the droplets, which allows them to be trapped and quantified with the filter. Also, the vapor pressure and volatility can determine the tendency of the compounds towards gas or droplet phase. As can be seen in the table above, in most cases, when compound under study is more volatile (such as Limonene with vapor pressure=1.6 mmHg) the concentration reported with PDMS-TFME is higher, since these compounds are found preferably in gas phase, however, less-volatile components (such as Linalool with vapor pressure=0.16 mmHg) prefer the liquid phase.

The findings also showed that the type (pressure and time) of carbonation can influence the final product. Since more carbonation creates more droplets in the headspace, the concentrations reported with filter will increase as well. This phenomenon was evident in the reported concentrations of limonene in orange-flavored soda and lime-flavored sparkling water, where the difference in droplet count was visible to the naked eye. High-pressure carbonation resulted in higher concentrations of limonene being detected in orange-flavored soda by the H-PAN filter compared to PDMS-TFME, whereas for lime-flavored sparkling water with lower number of droplets, the final reported concentration was much higher for PDMS-TFME compared to H-PAN filter.

Carbonation type also influences the repeatability of the sampling. For beer samples, droplet formation occurs due to biochemical processes which cause a stable foam form after the bottle is opened, rather than a stream of bubbles. This stability effect can be seen in the relative standard deviations of the reported concentrations. The stable foaming observed for beers enables more reproducible results compared to sodas, which have a decaying stream of bubbles and droplets.

In addition to the target compounds, the beverage analysis resulted in the identification of other components using the mass spectrometry library. For example, some compounds such as myrcene and o-cymene were identified with both PDMS-TFME and the H-PAN filter. In contrast, some higher-polarity compounds, such as furfural (below calibration range), 5-hydrxoymethylfurfural, and 1,4-anhydro-D-mannitol, were only detected in the droplets captured by the H-PAN filter, while certain non-polar compounds, such as decanal, nonanal, a-humulene, a and β-citral, and β-pinene were detected only with PDMS-TFME.

In the preceding description, for purposes of explanation, numerous details are set forth in order to provide a thorough understanding of the examples. However, it will be apparent to one skilled in the art that these specific details are not required. Accordingly, what has been described is merely illustrative of the application of the described examples and numerous modifications and variations are possible in light of the above teachings.

Since the above description provides examples, it will be appreciated that modifications and variations can be effected to the particular examples by those of skill in the art. Accordingly, the scope of the claims should not be limited by the particular examples set forth herein, but should be construed in a manner consistent with the specification as a whole.

What is claimed is:

1. A flow-through aerosol capture device comprising:
   a chamber defining an airflow path, and
   a heat-stable aerogel filter, disposed in the airflow path for capturing aerosol particles when an aerosol-containing gas passes through the filter;
   wherein the heat-stable aerogel filter comprises a heat-stable polyacrylonitrile PAN) aerogel, a heat-stable PAN/silica aerogel, a heat-stable polyetherimide aerogel, or a heat-stable polyamide aerogel.

2. The flow-through aerosol capture device according to claim 1, wherein the heat-stable PAN aerogel comprises cyclized PAN.

3. The flow-through aerosol capture device according to claim 2, wherein the cyclized PAN includes a polymer having monomers according to Formula (I) and/or Formula (II):

$$\left[\begin{array}{c}\text{Formula (I)}\\ \includegraphics\end{array}\right]$$

$$\left[\begin{array}{c}\text{Formula (II)}\\ \includegraphics\end{array}\right]$$

4. The flow-through aerosol capture device according to claim 3,
   wherein at least 50 mol %, of the heat-stable PAN aerogel are monomers according to Formula (I);
   wherein at least 50 mol %, of the heat-stable PAN aerogel are monomers according to Formula (II); or
   wherein at least 50 mol %, of the heat-stable PAN aerogel are monomers according to Formula (I) and monomers according to Formula (II).

5. The flow-through aerosol capture device according to claim 1, wherein the heat-stable aerogel filter comprises:
   fibers with an average diameter from about 200 nm to about 500 nm;
   fibers with an average length from about 0.5 mm to about 5.0 mm;
   fibers forming an aerogel having a density from about 3000 g/m³ to about 4000 g/m³;
   fibers having a thermal stability from about 200° C. to about 350° C.;
   fibers forming an aerogel filter having pressure drop from about 50 Pa to about 150 Pa;
   fibers with an average ratio of packing length:fiber diameter from about 25,000:1 to about 1,000:1; or
   any combination thereof.

6. The flow-through aerosol capture device according to claim 1, wherein the heat-stable aerogel filter comprises a heat-stable polyacrylonitrile (PAN) aerogel prepared by:
   electrospinning PAN to produce PAN fibers;
   cutting the PAN fibers;
   freeze-drying the cut PAN fibers; and
   heating the cut PAN fibers to produce the heat-stable PAN aerogel.

7. The flow-through aerosol capture device according to claim 6, wherein:
   electrospinning PAN comprises: electrospinning a 5% to 10% (wt/vol) PAN solution in a solvent, electrospinning at a voltage of 15 to 20 kV, electrospinning at a flow rate of about 1.0 to 2.0 mL/h, collecting the fibers at a needle-to-collector distance of 15 to 25 cm, or any combination thereof;
   cutting the PAN fibers comprises: blending a liquid dispersion of the PAN fibers, using a liquid dispersion wherein the PAN fiber to liquid ratio is from about 50 mg/100 mL to about 500 mg/100 mL, using a liquid dispersion where the liquid comprises water, or any combination thereof;
   freeze-drying the cut PAN fibers comprises: freezing at about −80° C. in a freezer, or flash-freezing in liquid nitrogen;
   heating the freeze-dried PAN fibers to produce the heat-stable PAN aerogel comprises: heating the PAN fibers to cyclization conditions;
   or any combination thereof.

8. The flow-through aerosol capture device according to claim 1, wherein the flow-through aerosol capture device is a needle trap device or a thermal desorption liner.

9. The flow-through aerosol capture device according to claim 8, wherein the flow-through aerosol capture device comprises a lumen, and at least one plug of the heat-stable aerogel filter in the lumen.

10. The flow-through aerosol capture device according to claim 1, wherein the flow-through aerosol capture device is a needle trap device, the needle-trap device further comprising sorbent particles.

11. The flow-through aerosol capture device according to claim 1, wherein the flow-through aerosol capture device is adapted to connect to a gas-transfer device for drawing or driving the aerosol-containing gas through the filter.

12. A flow-through aerosol capture device comprising:
a chamber defining an airflow path, and
a heat-stable aerogel filter, disposed in the airflow path for capturing aerosol particles when an aerosol-containing gas passes through the filter;
wherein the flow-through aerosol capture device is a needle trap device, and the needle-trap device further comprising sorbent particles;
wherein the needle trap device comprises a lumen holding the sorbent particles, and at least one plug of the heat-stable aerogel filter retaining the sorbent particles in the lumen.

13. The flow-through aerosol capture device according to claim 12,
wherein the plug of the heat-stable aerogel filter is from 0.5 mm to 30 mm in length;
wherein the lumen is packed with from about 10 mm to about 30 mm of sorbent particles;
or any combination thereof.

14. A flow-through aerosol capture device comprising:
a chamber defining an airflow path, and
a heat-stable aerogel filter, disposed in the airflow path for capturing aerosol particles when an aerosol-containing gas passes through the filter;
wherein the flow-through aerosol capture device is a needle trap device and the tip of the needle trap device is frusto-conical.

15. A heat-stable polymer aerogel comprising:
fibers with an average diameter from about 200 nm to about 500 nm;
fibers with an average length from about 0.5 mm to about 5.0 mm;
fibers forming an aerogel having a density from about 3000 g/m$^3$ to about 4000 g/m$^3$;
fibers having a thermal stability from about 200° C. to about 350° C.;
fibers forming an aerogel filter having pressure drop from about 50 Pa to about 150 Pa;
fibers with an average ratio of packing length:fiber diameter from about 25,000:1 to about 1,000:1; or
any combination thereof;
wherein the heat-stable polymer aerogel comprises a heat-stable polyacrylonitrile (PAN) aerogel, a heat-stable PAN/silica aerogel, a heat-stable polyetherimide aerogel, or a heat-stable polyamide aerogel.

16. The heat-stable polymer aerogel according to claim 15, wherein the heat-stable PAN aerogel comprises cyclized PAN.

17. The heat-stable polymer aerogel according to claim 16, wherein the cyclized PAN includes a polymer having monomers according to Formula (I) and/or Formula (II):

Formula (I)

Formula (II)

* * * * *